United States Patent [19]

Smith

[11] Patent Number: 4,894,784

[45] Date of Patent: Jan. 16, 1990

[54] APPARATUS FOR DISPENSING MONEY ORDERS

[75] Inventor: Lawrence G. Smith, Orlando, Fla.

[73] Assignee: Republic Money Orders, Inc., Dallas, Tex.

[21] Appl. No.: 132,661

[22] Filed: Dec. 10, 1987

Related U.S. Application Data

[60] Continuation of Ser. No. 60,762, Jun. 8, 1987, which is a division of Ser. No. 877,539, Oct. 31, 1986, Pat. No. 4,699,532, which is a division of Ser. No. 596,291, Apr. 3, 1984, Pat. No. 4,625,275.

[51] Int. Cl.⁴ ............................................. G06F 15/30
[52] U.S. Cl. .................................... 364/479; 235/379; 380/24; 902/1
[58] Field of Search ............... 364/400, 401, 406, 408, 364/478, 479, 405, 519, 200 MS File, 900 MS File; 235/375, 379-382.5, 431, 432, 433; 380/24; 400/50, 103-106, 121, 124; 902/8, 10, 24, 1

[56] References Cited

U.S. PATENT DOCUMENTS

| | | | |
|---|---|---|---|
| 3,848,798 | 11/1974 | Riley | 235/101 |
| 3,970,992 | 7/1976 | Boothroyd | 364/900 |
| 3,984,660 | 10/1976 | Oka et al. | 235/379 |
| 3,997,763 | 12/1976 | Schasser | 235/432 |
| 4,025,905 | 5/1977 | Gorgens | 364/900 |
| 4,035,792 | 7/1977 | Price et al. | 340/570 X |
| 4,053,735 | 10/1977 | Foudos | 364/401 X |
| 4,082,945 | 4/1978 | van de Goor et al. | 235/379 |
| 4,175,694 | 11/1979 | Donabin | 235/431 X |
| 4,225,779 | 9/1980 | Sano et al. | 364/900 X |
| 4,266,121 | 5/1981 | Hirose | 235/381 |
| 4,270,042 | 5/1981 | Case | 235/379 |
| 4,317,028 | 2/1982 | Simjian | 235/379 X |
| 4,341,951 | 7/1982 | Benton | 374/406 X |
| 4,355,369 | 10/1982 | Garvin | 364/900 |
| 4,385,285 | 5/1983 | Horst et al. | 235/379 X |
| 4,417,137 | 11/1983 | Lundblad | 235/379 |
| 4,625,275 | 11/1986 | Smith | 364/479 X |
| 4,699,532 | 10/1987 | Smith | 364/479 X |

Primary Examiner—Joseph Ruggiero
Attorney, Agent, or Firm—Michael A. O'Neil

[57] ABSTRACT

Apparatus for dispensing money orders at a plurality of retail establishments is provided, including one or more data collector devices connected to a host device. Preferably, each of the money order dispensers include a digital processor for controlling the overall operation thereof, a keyboard for entering transaction data to request the printing of a money order, a display for displaying the transaction data, and a dot matrix printer for printing the requested money order. Each dispenser further includes an electrically-erasable programmable read only memory (E²PROM) for storing a security inhibit printing code, this code being automatically changed to prevent actuation of the printer when the security of the dispenser is compromised. The physical dimensions of the money order dispenser are reduced by providing a dot matrix printer for receiving money orders in a transverse fashion, and software routines are provided to control the dot matrix printer to "rotate" the printed characters whereby money orders are dispensed in a readable fashion.

3 Claims, 3 Drawing Sheets

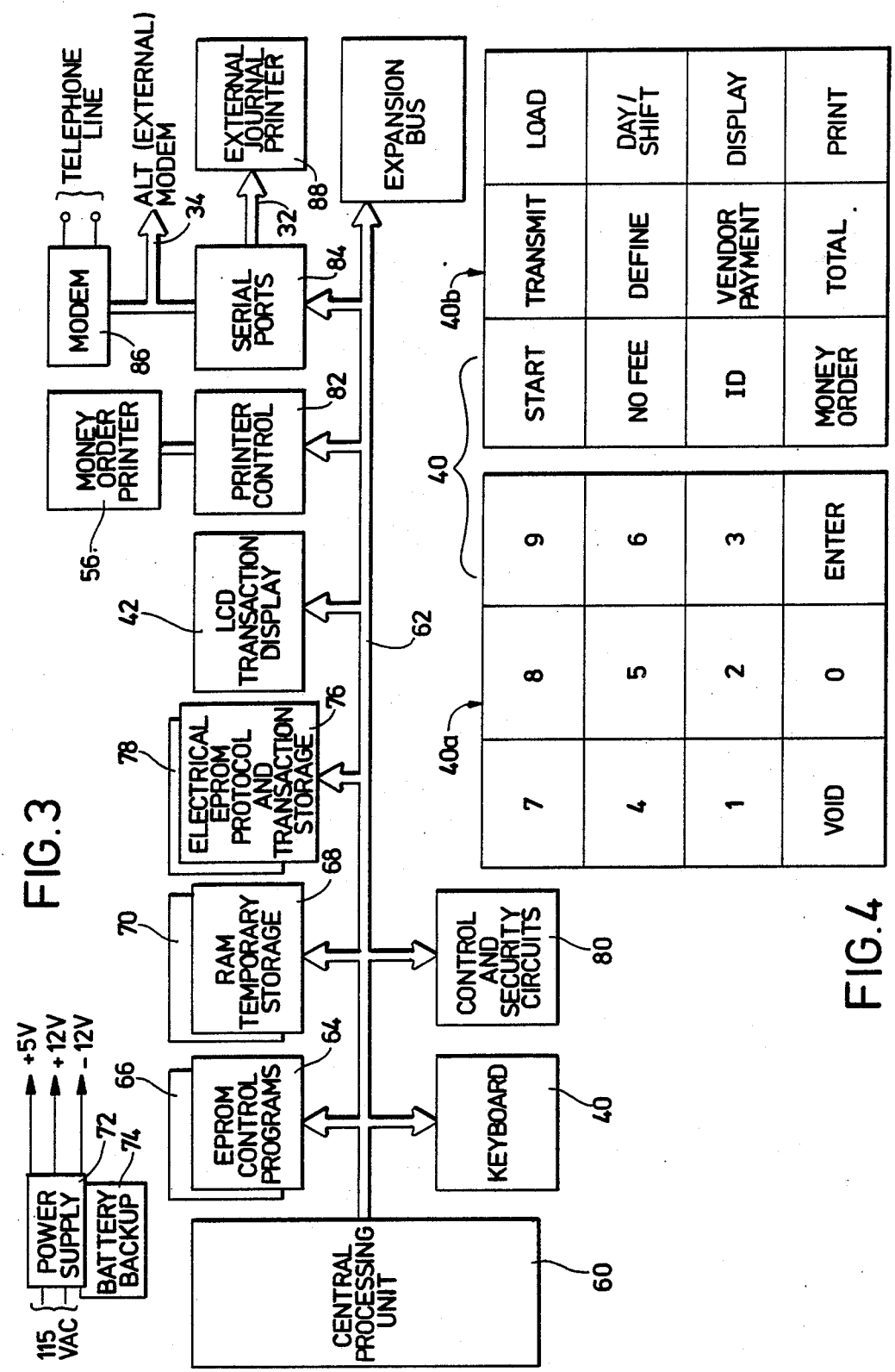

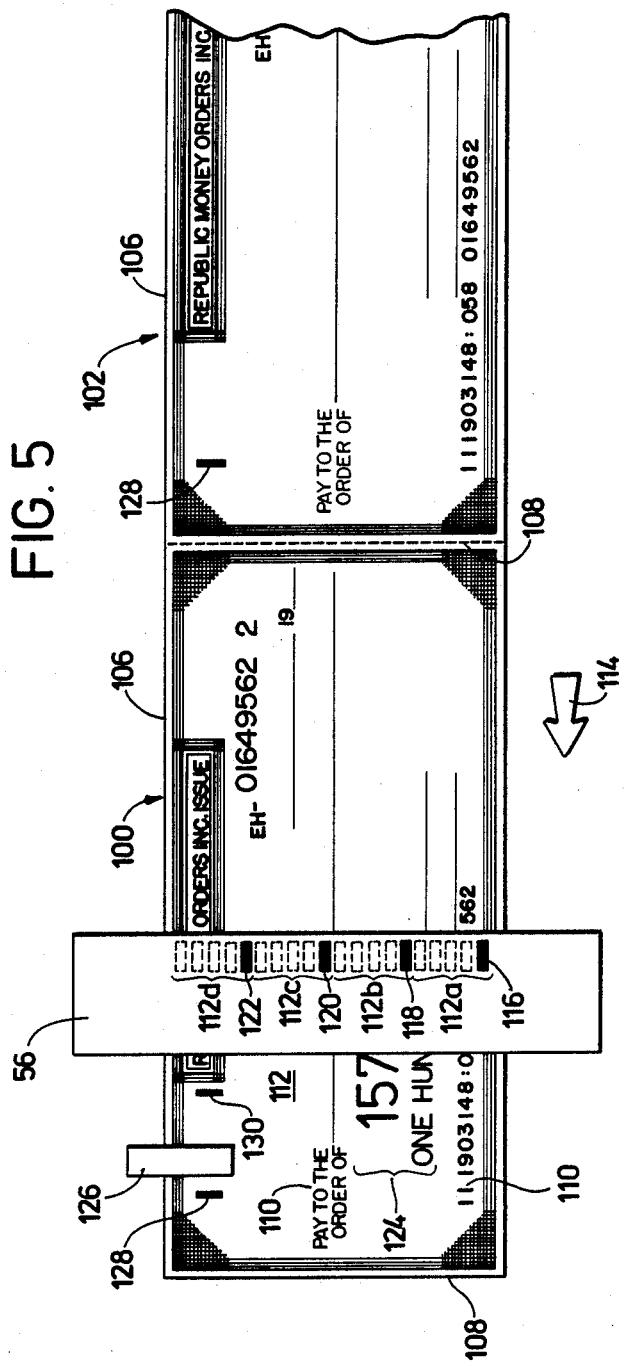

APPARATUS FOR DISPENSING MONEY ORDERS

This is a continuation of application Ser. No. 07/060,762 filed on June 8, 1987, which is a division of application Ser. No. 06/877,539 filed on Oct. 31, 1986, now U.S. Pat. No. 4,699,532, which is a division of application Ser. No. 06,596,291, filed Apr. 3, 1984, now U.S. Pat. No. 4,625,275.

TECHNICAL FIELD

The present invention relates generally to dispensing machines, and more particularly to a method and apparatus for dispensing money orders at a plurality of retail establishments.

BACKGROUND OF THE INVENTION

Money order dispensing machines are well-known in the prior art. Such machines typically include a number of moveable printing levers and a printing control arm. In response to a customer request, the machine operator positions the printing levers at a position corresponding to the requested amount of the money order, inserts a blank order in the machine, and actuates the printing control arm. The above steps must be repeated each time a money order is requested by a customer.

Such mechanical money order dispensing machines have proven inadequate since they do not include any effective means for securing the dispenser. In particular, the machine operator can produce a "counterfeit" order by simply separating a blank money order into its separate parts, a customer portion and a vendor portion, and printing different numerical amounts thereon. Such counterfeiting techniques are facilitated by the simple mechanical nature of the prior art money order dispenser, wherein blank money orders are inserted one at a time for manual printing. Of course, this manual operation also makes the dispenser cumbersome to use, as well as extremely slow.

Accordingly, there is a need to provide a money order dispenser having increased security, and which can also vend money orders efficiently.

SUMMARY OF THE INVENTION

The present invention provides a method and apparatus for dispensing money orders at a plurality of retail establishments. In a preferred embodiment, one or more sets of money order dispensers are connected to one or more data collector devices, respectively, with the data collector devices in turn connected to a host device for controlling the overal operation of the system. Generally, each of the money order dispensers includes a digital processor to control the operation thereof, a keyboard for entering transaction data to request the printing of a money order, and a display for displaying system messages and the entered transaction data. Memory devices associated with the digital processor are also provided for storing transaction data, operating programs and control data, and a dot matrix printer is used for printing alphanumeric indicia on the dispensed money orders.

In accordance with more specific features of the present invention, each dispenser preferably includes an electrically-eraseable programmable read only memory ($E^2PROM$). This $E^2PROM$ stores a security inhibit printing code which must be "recognized" by a printer software routine to enable the dot matrix printer. Each dispenser further stores a control software routine which operates to change or erase the security inhibit printing code stored in the $E^2PROM$ when the security of the dispenser is compromised. For example, when a storage compartment cover of the dispenser is opened outside of a proper money order loading sequence, the control software routine changes the security inhibit printing code, thereby inhibiting the dot matrix printer. However, the remainder of the dispenser peripherals operate normally to allow the system operator to reestablish printer operation after the "compromised" condition has been rectified.

Preferably the dot matrix printer receives a money order in a transverse fashion with respect to the normal direction of printing thereon. This facilitates the use of a small printer, thereby reducing the overall dimensions of the dispenser. The printer software routine associated with the dispenser is further used to control the dot matrix printer in such a manner to change the normal orientation of the alphanumeric indicia printed on the money order such that the order is produced with the requested amount in a readable form. The dot matrix printer also includes a photocell sensing device for determining whether a money order and a printing ribbon are properly located in the dot matrix printer prior to the printing of the order. The money orders are delivered to the dot matrix printer in a continuous fan-folded stack. These features of the present invention insure that "counterfeit" money orders cannot be printed by the vendor.

In accordance with other features of the present invention, each data collector has a "manager" function which allows the system operator (e.g., a financial institution) to define control data for managing the operation of the dispensers connected thereto. In particular, the operator may predetermine authorized operational limits, such as a maximum limit on the amount of the money order, maximum amounts for higher limit items available with proper authorization codes, and various fee rates to be charged to the customers. This control data and changes thereto are down-loaded into the $E^2PROM$ associated with each processor.

BRIEF DESCRIPTION OF THE DRAWINGS

For a more complete understanding of the present invention and the advantages thereof, reference is now made to the following Description taken in conjunction with the accompanying Drawings in which:

FIG. 3 is a block diagram of the electronic hardware incorporated in the money order dispenser of FIG. 2;

FIG. 4 is a representation of the preferred embodiment of the keyboard used in the money order dispenser of FIG. 2; and FIG. 5 is a top view of the dot matrix printer incorporated in the dispenseer of FIG. 2 detailing the movement of a money order therethrough.

DETAILED DESCRIPTION

Figure 1:
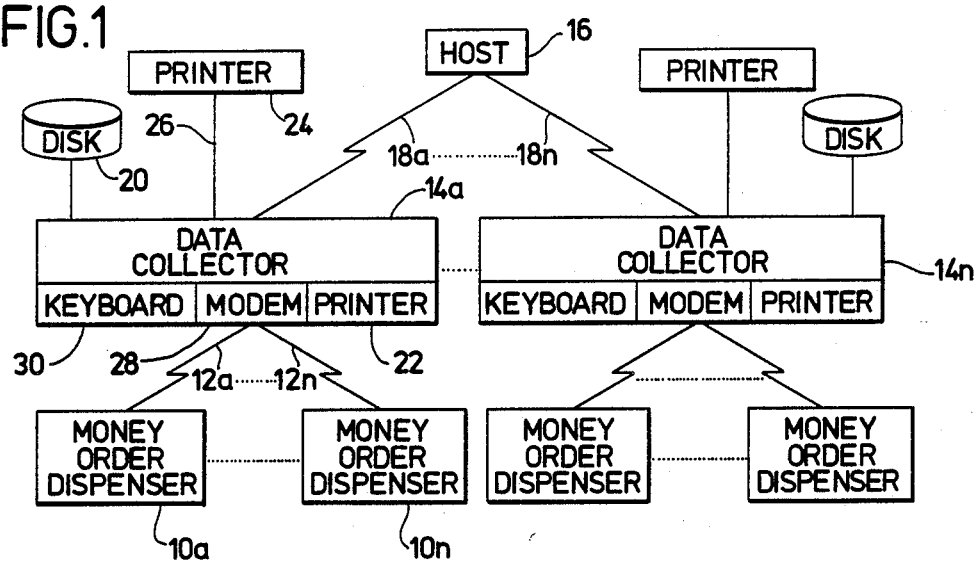
FIG. 1 is a block diagram of a desired system configuration incorporating a plurality of money order dispensers connected to one or more data collector devices, which are in turn connected to a host device.

With reference now to the FIGURES wherein like reference characters designate like or similar elements, FIG. 1 is a block diagram of a representative system according to the present invention for dispensing money orders at a plurality of retail establishments. In FIG. 1, a money order dispenser 10a is shown connected directly through a communications link 12a to a data collector 14a. The dispenser 10a is located at a retail establishment where customers request the issuance of a money order from the retail establishment vendor. The data collector 14a provides various management functions for money order dispensers 10a–10n on a time-shared basis. In the preferred embodiment, a plurality of data collectors 14a–14n are connected to a host device 16 through communications links 18a–18n. Each communications link is either a modem link or an RS232 serial full-duplex interface for direct connection to the host device 16. Alternately, the data collectors 14 may be connected to an external modem (not shown) and then to the host device 16.

As shown in FIG. 1, the data collector 14a includes a floppy diskette 20 for storing a cumulative record of the money order transactions at its respective money order dispensers 10a–10n. Data collector 14a also includes an internal printer 22 for printing this transaction information, although alternately, an external printer 24 is used for this purpose through an RS232 serial link 26. An internal modem 28 is also provided for direct communications to the money order dispensers 10a–10n over the communications links 12a–12n at variable baud rate settings. As will be described in more detail below, each data collector 14 has the ability to read and program various memory devices in each money order dispenser connected thereto.

Referring again to FIG. 1, the data collector 14a further includes a full alphanumeric keyboard 30 which, as will be described below, allows the system operator (e.g., a financial institution) to define control data for managing the operation of the money order dispensers connected thereto. In particular, through the keyboard 30, or alternately a "manager" function switch associated with the data collector 14a, the operator sets limits on the following variables listed in TABLE I:

TABLE I

| VARIABLE NAME | DEFINITION |
| --- | --- |
| [-MCH MO# XXXXX-] | Total number of money orders to be printed before dispenser must be reauthorized |
| [-MCH MO# XXXXXXX-] | Maximum money order dollar amount to be issued before dispenser must be reauthorized |
| [-CST MO$ XXXXX.XX-] | Maximum dollar value per money order per customer |
| [-MCH CK# XXXXX-] | Maximum number of vendor payments which may be printed before dispenser must be reauthorized |
| [-MCH CK# XXXXX.XX-] | Maximum vendor payment dollar amount which can be issued before dispenser must be reauthorized |
| [-CST MO# XXXX-] | Maximum number of money orders which can be printed per customer |
| [-VND CK# XXXX-] | Maximum number of vendor payments which can be printed per vendor |
| [-VND CK# XXXXX.XX-] | Maximum dollar amount per vendor payment |
| [-WARN-#BLANKS XX-] | Number of blank money orders left in dispenser when warning issued |
| [-WARN-#TRANS XX-] | Amount of transaction storage left in dispenser memory when warning is issued |
| [-LOCK # ERRORS XX-] | Number of errors allowed before dispenser locks. |

As used throughout the remainder of the specification, the above limits and codes are referred to as "control" data. This control data is transmitted to the various money order devices 10a–10n located at the plurality of retail establishments.

Preferably, each of the other data collectors 14 shown in FIG. 1 include the same type of peripheral devices associated with the data collector 14a. The data collectors 14a–14n also have the capability of automatically polling their associated money order dispensers on command, as well as the ability to recognize invalid data transmissions. Moreover, each data collector includes various software routines for controlling such automatic polling, and for providing test procedures to aid in trouble-shooting and repairing the dispensers.

It should also be appreciated that although the configuration of FIG. 1 is desirable, it is not meant to limit the scope of the present invention. In particular, each money order dispenser of the invntion is capable of fully independent stand-alone operation, as well as a direct on-line connection to a point-of-sale system.

Figure 2:
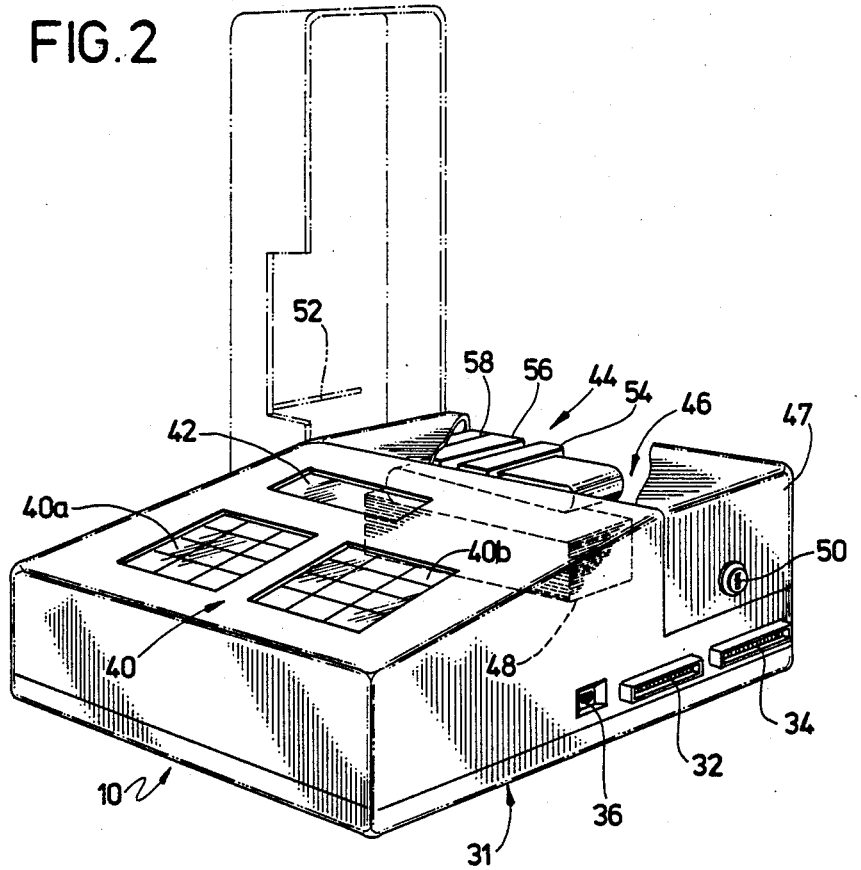
FIG. 2 is a perspective view of one of the money order dispensers of FIG. 1 having its open storage compartment cover shown in phantom.

Referring now to FIG. 2, a perspective view is shown of one of the money order dispensers 10 of FIG. 1. Preferably, the money order dispenser 10 includes a removable bottom panel 31 which is fastened to a countertop at the retail establishment by appropriate securing means. The dispenser 10 is designed to be operable from 115 volts a.c. power, or d.c. power from an appropriate point-of-sale system. The power options are selectable by an internal selection switch (not shown). The dispenser 10 includes two RS232 connector input jacks 32 and 34 for connection to an external journal printer and external modem, respectively. The journal printer (not shown) is a conventional dot matrix printer and is provided for printing a journal tape of all transactions of the money order dispenser. The dispenser 10 also includes a modular phone jack 36, which is connected to an internal modem for data transmission to one of the data collectors 14 as shown in FIG. 1. When the internal modem is not used, the modem interface is brought to the RS232 connector jack 34 for connection to an external modem. Preferably, the external connection is used whenever an acoustical modem is required.

Referring back to FIG. 2, the money order dispenser 10 includes several input/output devices: a keyboard 40 having first and second sections 40a and 40b, a liquid crystal display (LCD) 42 and a dot matrix printer assembly represented generally by the reference numeral 44. As will be described in more detail below, each section of the keyboard 40 includes twelve (12) control keys for entering transaction data to request the printing of a money order, as well as for controlling other functions of the dispenser. The LCD display 42 is preferably a twelve (12) digit display for displaying the transaction data entered via the keyboard 40, and for displaying system messages received from the data collector and host devices associated with the money order dispenser. The dot matrix printer assembly 44 is provided to print the money orders held in a storage compartment 46. As shown in phantom in FIG. 2, the money orders are provided in a continuous fan-folded stack 48 in the storage compartment 46 to insure that counterfeit money orders cannot be printed by the vendor. A keylock 50 is provided to secure a storage compartment cover 47 in a locked position in the dispenser housing. This lock may be electronic if desired. The stack 48 of money orders is loaded into the dispenser by opening the storage compartment cover 47 to an open position as represented in phantom.

As also seen FIG. 2, the storage compartment cover 47 includes an output throat 52 through which the printed money orders are dispensed. To effect printing of a money order, the dot matrix printer assembly 44 is provided with a sprocket and/or pressure feed clamp 54 for moving the money orders through the dispenser 10, a dot matrix printer 56 and a printing ribbon 58. In response to a customer request for a money order, the vendor enters the requested amount via the keyboard 40 as will be described below. If the money order is within the authorized limits of the dispenser, the dot matrix printer 56 is actuated to print the requested amount alphanumerically on the face of the money order. Upon completion of the printing, the pressure feed clamp 54 automatically advances the printed money order through the output throat 52 for manual removal by the operator. The transaction data, including money order amount, date and time, is then stored on a journal tape by the external journal printer, and also in internal memory.

As will be described below, the dot matrix printer 56 preferably includes a printer carriage for receiving the money order in a transverse fashion with respect to the normal printing of alphanumeric information thereon. This transverse feeding of the money orders allows the use of a relatively small dot matrix printer, thereby reducing the overall physical dimensions of the dispenser. The present invention further provides a control means for controlling the dot matrix printer to "rotate" the alphanumeric indicia printed on the money order such that the money order is produced in a readable form. The control means is required since normal printing of the indicia would render the money order unreadable due to the transverse feed. Accordingly, a printer software routine to be described is provided for controlling the printer to produce readable alphanumeric indicia on the printed money orders.

Referring now to FIG. 3, a block diagram is shown of the electronic hardware incorporated in the money order dispenser of FIG. 2. In particular, this hardware includes a central processing unit (CPU) 60 for controlling the overall operation of the money order dispenser 10a. The CPU 60 includes data, address and control buses, represented generally by the bus 62. As seen in FIG. 3, the keyboard 40, LCD display 42 and money order printer 56 are connected to the CPU 60 and are controlled thereby by various operating and applications programs resident in eraseable programmable read only memories (EPROM's) 64 and 66. EPROM's 64 and 66 are connected to the CPU 60 by the bus 62. As also seen in FIG. 3, the money order dispenser 10 includes random access memories (RAM's) 68 and 70 connected to the CPU 60 by the bus 62 for providing temporary storage of data processed by the CPU. The money order dispenser further includes a power supply circuit 72 driven off a standard 115 volts a.c. wall outlet, and an internal rechargeable battery backup 74. The battery backup 74 is provided to supply power for a sufficient time to allow complete memory protection should power be suddenly interrupted to the dispenser 10.

The money order dispenser 10 further includes a pair of electrically-eraseable programmable read only memories ($E^2PROM$'s), or equivalent semi-permanent memory device such as a battery support RAM, 76 and 78 connected to the CPU 60 by the bus 62. The $E^2PROM$ 76 is provided for storing various communication protocols utilized by the money order dispenser. In particular, the $E^2PROM$ 76 supports the NCR foreign attachment protocol, MSI special protocol, SDLC protocol and IBM 3680 store system interface. Additional protocols may be down-loaded into the $E^2PROM$ 76 by the data collector as required. Data and control codes for the above protocols are well known in the prior art and a description thereof is unnecessary for a complete understanding of the present invention.

According to a feature of the present invention, the $E^2PROM$ 78 is provided to store the transaction data for between 500-2000 vendor/customer transactions. Moreover, the $E^2PROM$ 78 also stores a security inhibit printing code for the money order dispenser 10 for security purposes. The printer software routine for controlling the dot matrix printer 56 must "recognize" the security inhibit printing code resident in $E^2PROM$ 78 in order to operate the dot matrix printer 56. If the security of the money order dispenser is compromised in any way, a control software routine stored in EPROM 64 operates to change or erase the security inhibit printing code stored in the $E^2PROM$ 78. Once this code has been changed or erased, the software for controlling the printer 56 cannot be processed by the CPU 60, thereby preventing further printing of money orders from the dispenser. However, although the printer operation is inhibited, the remainder of the dispenser peripherals operate normally to allow the link to be restored by the financial institution. Preferably, the security inhibit printing code is down-loaded from the respective data collector device or the host device, and may be changed at regular intervals for increased security.

A "compromise" condition exists, for example, when the storage compartment cover 47 is opened outside of a normal money order loading sequence to be described, or when the bottom panel 31 is removed without a service request. The security code will also be changed or erased to inhibit the printer when power to the dispenser is interrupted, if a previously determined amount or number of money orders, or other system operator-imposed constraints, have been exceeded, or if no recent communications have taken place within authorized time limits.

A control and security circuit 80 is also provided and includes an internal clock for controlling the timing of the various circuits shown in FIG. 3, and also for defining the date and time information for the transaction data. As discussed above, the LCD display 42 is provided for displaying this transaction data as well as system messages. The display software stored in EPROM 66 also disables the display if the dispenser is not in use for a period of time, and controls the display to indicate when the E$^2$PROM 78 is approximately filled with transaction data. The money order dispenser 10 will discontinue further issuance of money orders and notify the operator if the E$^2$PROM 46 is full. According to the present invention, the transaction data is then transmitted to the respective data collector device of FIG. 1 before the money order dispenser 10 may again issue money orders. The use of the non-volatile reusable E$^2$PROM 78 or equivalent device in conjunction with the battery backup 74 insures that the transaction data is not lost upon power failure or surges.

Referring simultaneously to FIGS. 2 and 3, the dot matrix printer 56 is controlled by a printer control circuit 82 connected to the CPU 60 by the bus 62 and the printer software routine. The money order dispenser 10 further includes serial ports 84, connected to the CPU 60 by the bus 62, for driving an internal modem 86, and the external journal printer 88 via an RS232 duplex link. As noted above, when the internal modem 86 is not used, the modem interface is brought to the RS232 connector jack 34: or an external modem. Preferably, the external modem connection is used whenever an acoustical modem is required.

Referring now to FIG. 4, a desired format of the keyboard 40 of the money order dispenser is shown. This keyboard includes a first section 40a including the numerical keys "0"–"9" for entering control and transaction data, and a "VOID" and "ENTER" control key. The second section 40b of the keyboard 40 includes various control keys, the function of which will be described in more detail below.

Operation of the money order dispenser 10 of the present invention occurs through a plurality of operation modes. The first of these modes is a "Definition Mode", during which various codes are entered, inspected or changed by the operator. The LCD display 42 defines which entry to enter, inspect or change. In operation of this mode, if the entry is to be changed, a new value is entered via the first section 40a of the keyboard 40 followed by depression of the "ENTER" key. If the displayed entry is to remain unchanged, the "ENTER" key is the only key depressed. The control keys of the second section 40b generally define what messages are presented to the operator.

Since the money order dispenser is preferably left "on" at all times, the Definition Mode is entered when the operator pushes the "START" and "DEFINE" keys of the second section 40b. The following message is then displayed on the display 42:

[-SECURITY #_-]

The security number is a five digit number and is not displayed. This number must be correctly entered by the vendor in order for the sequence to continue. After the security number has been entered and verified, a manual entry of a store identification number is required. Accordingly, the following store number message is displayed on the LCD display 42:

[-STXXXXXXXXXXXXXX-]

The store number may be 1–14 characters long and once entered by the vendor is transmitted to the respective data collector as discussed above with respect to FIG. 1.

The Definition Mode sequence continues with depression of the "DAY/SHIFT" key which produces the following sequential displays for entering or verification of date and time information, this information being recorded as part of the transaction data:

[-DATE XX/XX/XX-]

[-TIME XX:XX:XX-]

The Definition Mode sequence further continues with the following displays for entering of identification entries, money order fees, a phone number dialed automatically under certain conditions, and an "ID USE" code for money order and vendor payment transactions:

[-ID XXX-]

[-FEE XXX.XX, YY.YY-]

[-PHX-XXX-XXX-XXXX-]

[-ID USE    X-]

Specifically, the system includes twenty money order fees where XXX.XX is the dollar breakpoint, and YY.YY is the fee charged for any money order greater than the previous money order and less than or equal to the present XXX.XX breakpoint. The "ID USE" code takes on the following possible values:

0-No ID Number needs to be entered;
1-All ID Numbers are entered at the start of the day only;
2-A valid ID Number must be entered for each transaction.

Entering of the above code information at the money order dispenser, as well as the information in TABLE I at the data collector, constitutes the Definition Mode. Once the last enter key has been pressed at the dispenser, the display screen 24 will blank and the Definition Mode will be exited.

Under a "Start Mode", the operator of the money order dispenser at a retail establishment enters certain information at the start of each day. In particular, a start-up "ID" or "access" code is required to operate the dispenser. In the Start Mode, actuation of the "START" key of the second section 40b causes the following message to be displayed:

[-ID    -]

The operator must then enter a valid ID number to start the system. If the "ID USE" code discussed above is "1", the rest of the valid ID numbers must then be entered. Subsequently, the following message is displayed:

[-BEG #XXXXXXXXX-]

The above display prompts the operator to enter an internal serial number of the first money order in the stack. The serial number is automatically incremented for each money order dispensed. Once the last enter key has been depressed, the display screen will blank and the Start Mode will be exited.

The third mode of operation is the "Issue Money Order" Mode. This Mode is entered when a customer requests the issuance of a money order. To accomplish this task, the operator pushes the "START" key of the second section 40b. If the "ID USE" Code is "2", an "ID" number is required, and this number is then entered via the first section 40a of the keyboard, followed by depression of the "ID" key of the second section 40b. If no fee is to be charged, the "NO FEE" key of the second section 92 is also depressed. Subsequently, a dollar amount for the money order is entered via the numeric keys of the first section 40a followed by depression of the "MONEY ORDER" key of section 40b. The "TOTAL" key of section 40b is then depressed if more than one money order is required to be printed. The fee for each money order is automatically added to the total. Finally, the "PRINT" key of section 40b is then depressed and the requested money order is printed by the dot matrix printer 56 as discussed above with respect to FIG. 2. Note that if the "VOID" key of section 40a is depressed before the "TOTAL" key, however, the last money order entry will be voided. Moreover, if the "VOID" key is depressed before the "PRINT" key is depressed, all the money orders for the current customer are voided.

Under another operational mode, an "Issue Vendor Payments" Mode, the vendor of the retail establishment may receive payments according to the limits established by the operator of the data collector device. This mode requires depression of the "START" key and entering of an "ID" if the "ID USE" code is set as "2". Subsequently, the "VENDOR PAYMENT" key of section 40b is depressed followed by the "TOTAL" and "PRINT" keys as discussed above with respect to the issuance of a money order.

Under a "Load Mode", money order forms are loaded into the money order dispenser 10. This is accomplished by opening the money order storage compartment cover 47, depressing the "START" key and then a "LOAD" key of section 40b. Depression of these keys will produce the following sequential display messages:

[-SECURITY #     -]

[-BEG #XXXXXXXX-]

[-END #XXXXXXXX-]

The security number is the same number discussed above in the Definition Mode. The last two codes above are the beginning and ending serial numbers of the blank money order stock which must be entered when loading a new series of money orders. Once the last enter key has been depressed and the storage compartment cover 47 has been closed, the display 42 will blank and the Load Mode will be exited.

The money order dispenser also includes a "Transmission Mode" which is entered upon depression of the "START" and "TRANSMIT" keys of section 40b. Upon depression of these keys, the following sequential display messages occur:

[-SECURITY #     -]

[-DIAL TELEPHONE #-]

After entering of the security number and dialing the telephone number for connection to the appropriate data collector, the operator places the phone receiver in the modem. The "START" key is then depressed to cause the dispenser to transmit the stored transaction data in E²PROM 78 to the data collector. After transmission the following message is displayed to prompt the operator to disconnect the dispenser from the modem:

[-DISCONNECT RMOD-]

This constitutes the Transmission Mode. Once the last data is transmitted and a verification signal is received by the money order dispenser, the dispenser automatically terminates the connection, displays the above disconnect message and exits the Transmission Mode.

As discussed above, an important feature of the present invention is the use of the dot matrix printer 56 which is designed to receive a money order in a transverse direction with respect to the printing of normal indicia thereon. The movement of money orders through the dot matrix printer in a transverse fashion facilities the use of a small dot matrix printer, thereby reducing the overall dimensions of the money order dispenser of the present invention. However, since the money order is passed through the dot matrix printer in a transverse fashion, normal printing of indicia thereon would render the money order unreadable. To overcome this problem, the present invention includes software routines stored in the EPROM's 64 and 66 to "rotate" the alphanumeric characters during printing on the money order. Therefore, since the money orders pass through the dot matrix printer in a transverse fashion, and the characters are rotated under software control, the money order exits from the dispenser in a readable fashion.

Referring now to FIG. 5, a top view is shown of the movement of a money order through the dot matrix printer 56 of the present invention. Specifically, the continuous fan-folded stack 48 of money order forms includes a money order form 100 currently being printed and a next money order form 102. As seen in FIG. 5, each of the money order forms includes relatively long longitudinal sides 106 and relatively short transverse sides 108. Each money order form is interconnected along the transverse sides 108 thereof. As also seen in FIG. 5, each of the money order forms includes indicia 110 preprinted thereon in a longitudinal direction.

In operation, the pressure feed clamp 54 advances the money order forms 100 and 102 serially through a printing zone 112 by movement of the fan-folded stack in the longitudinal direction as represented by the arrow 114. The dot matrix printer 56 includes printing elements, for example elements 116, 118, 120 and 122, each of which reciprocate transversely to print alphanumeric indicia in four regions of the printing zone 112. Specifically, print element 116 moves transversely through the region 112a of the printing zone 112, print element 118 moves transversely through the printing zone 112b, etc.

Therefore, as seen in FIG. 5, the dot matrix printer 56 extends transversely across the printing zone 112 for printing variable alphanumeric indicia on the money order forms. It should be appreciated, however, that since the dot matrix printer normally prints indicia in a transverse direction, normal operation of the printer would render the money order forms unreadable. Accordingly, the printer software routine controls the various print elements 116, 118, 120 and 122 to form the variable alphanumeric indicia 124 on the money order forms in the longitudinal direction. Thus the money order forms are output from the money order dispenser in a readable fashion.

According to another important feature of the present invention, the dot matrix printer assembly 44 includes a photocell 126 which is used to sense the presence of first and second code marks 128 and 130, printed on the money order forms. Specifically, the first code mark 128 is preprinted on each money order form for the purpose of ensuring that the money order forms are properly aligned prior to printing. To this end, the photocell 126 generates a first control signal to the digital processor 60 upon reading the first code mark 128, thereby indicating proper alignment of the money order form. Moreover, prior to the printing of the variable alphanumeric indicia 124 on the money order 100, the printing ribbon 58 is actuated to print the second code mark 130. In operation, the photocell 126 must sense the presence of the second code mark 130 prior to printing of the alphanumeric indicia 124. Accordingly, the printing ribbon 58 must be properly located to effect printing of the second code mark 130 before the dot matrix printer 56 is driven to print a money order. This feature of the present invention ensures that "counterfeit" money orders cannot be printed by manipulation of the printing ribbon, or other disablement of the printing device.

The program listings for (1) changing the security inhibit printing code, (2) controlling the keyboard operation as described above with respect to FIG. 4, and (3) accomplishing the printing of "rotated" alphanumeric indicia on a money order are set forth below:

```
EEPROM DATA AREA

PAGE
;EEPROM DATA LOCATED AT E000H-E3FFH
    EPRM      SEGMENT AT 0E000H
;DOWN LOADED STORE INFORMATION
    SCRTY     DM       ?              :SECUTITY NUMBER
    STACC     DM       ?              :STORE #  MAJOR ACCOUNT
    STSTE     DB       ?              :STORE #  STATE
    STSUB     DB       ?              :STORE #  SUB ACCOUNT
    STDIV     DM       ?              :STORE #  DIVISION
    STSTR     DM       ?              :STORE #  STORE
    MONTH     DB       ?              :DATE   MONTH
    DAY       DB       ?              :DATE   DAY
    YEAR      DB       ?              :DATE   YEAR
    PHONE     DB       11 DUP(?)      :TELEPHONE NUMBER
    USE       DB       ?              :ID USE CODE 0 NO ID NEEDS TO
                                       BE ENTERED
                                      :1-ONE ID PER SHIFT/DAY
                                      :2-ID FOR EVERY TRANSACTION
    ID        DB       NID DUP(?)     :IDENTIFICATION NUMBERS

;RMOD STATUS INDICATORS - 0/1
    RMODS     DB       ?              :RMOD STATUS - CLOSED/OPEN
    MODMS     DB       ?              :MODEM STATUS - DISCNCT/DNCT
    CMPPS     DB       ?              :MC PRINTER STATUS -
                                       OK/DISABLED
    JRRRS     DB       ?              :JR PRINTER STATUS - OK
                                       DISABLED

RO Assembles 03-06-84             PAGE 1-8

EEPROM DATA AREA

KEYBS     DB       ?              :KEYBOARD STATUS - OK/LOCKED

;DATA DETERMINED AT RUN TIME-STORED HERE TO PRESERVE WHEN POWER
OFF
    LOCKC     DB       ?              :ERROR COUNT BEFORE LOCKUP
    TRPTR     DB       ?              :TRANSACTION POINTER
    TXPTR     DB       ?              :TRASMISSION POINTER
    FIDT      DB       NID DUP. (?)   :FEE TOTAL PER ID

MCNT      DW       ?              :MO NUMBER TOTAL
    MAMT      DD       ?              :MO AMOUNT TOTAL
    VCNT      DW       ?              :VP NUMBER TOTAL
    VANT      DD       ?              :VP AMOUNT TOTAL
    FAMT      DD       ?              :FE AMOUNT TOTAL
    VOID      DW       ?              :NUMBER OF VOIDS
    TCNT      DW       ?              :TOTAL TRANSACTIONS
    TAMT      DD       ?              :TOTAL AMOUNT
```

```
;TRNSACTION BUFFER-FILLS UP REST OF EEPROM-ROTATING BUFFER
TRBFRS  DB      ?                       :START OF TRANSACTION BUFFER
TRBFRE  DB      ?                       :END OF TRANSACTION BUFFER
EPRM    ENDS

;EEPROM DATA LOCATED E4000H-E5FFFH
;DOWN LOADED PROTOCOL INFORMATION
EPRM    SEGMENT AT 0E400H
;$$$NO DATA DEFINED$$$
EPRM    ENDS
SUBTTL  START OF PROGRAM - POWER OF SELF TEST AND
        INITIALIZATION AT FE000H

START OF PROGRAM

PAGE

CODE    SEGMENT OF AFE00H
START:  CLI                             ;DISABLE INTERRUPTS
                                        ;TEST FLAGS, REGISTERS,
                                            CONDITIONAL JUMPS
        MOV     AH,0D5H                 ;SET FLAGS-SF,ZF,AF,PF,CF
        SAHF
        JNS     STERR
        JNZ     STERR
        JNP     STERR
        JNC     STERR
        LAHF
        MOV     CL,5                    ;SET CARRY
        SHR     AH,CL
        JNC     STERR
        MOV     AL,40H                  ;SET OVERFLOW
        SHL     AL,1
        JNO     STERR
        XOR     AX,AX                   ;CLEAR FLAGS
        SAHF
        JS      STERR
        JZ      STERR
        JP      STERR
        JC      STERR
        LAHF
        MOV     CL,5                    ;RESET CARRY
        SHR     AH,CL
        JC      STERR
        SHL     AH,1                    ;RESET OVERFLOW
        JO      STERR
                                        ;TEST REGISTERS WITH ALL ONE'S
                                            AND ZERO'S
        MOV     AX,0FFFFH
        STC                             ;SET CARRY - LOOP CONTROL
STRT1;  MOV     DX,AX                   ;LOOP TO WRITE PATTERN TO ALL
                                            REGISTERS
        MOV     BX,DS
        MOV     ES,BX
        MOV     CX,ES
        MOV     SS,CX
        MOV     DX,SS
        MOV     SP,DX
        MOV     BP,SP
        MOV     SI,BP
        MOV     DI,SI
        JNC     STRT2
        XOR     AX,DI                   ;END OF FIRST TIME THROUGH
        JNZ     STERR                   ;PATTERN NOT ALL ONE'S
        CLC                             ;CLEAR CARRY
        JNC     STRT1                   ;REPEAT WTIH ALL ZERO'S
STERR;  HLT                             ;POWER ON SELT TEST ERROR
STRT2;  OR      AX,DI                   ;END OF SECOND TIME THROUGH
        JNZ     STERR                   ;PATTERN NOT ALL ZERO'S
                                        ;TEST RAM WITH FF,AA,55,01,00
                                            PATTERNS
        SUB     AX,AX                   ;INITIALIZE ES & DS
        MOV     ES,AX
        MOV     DS,AX
        SUB     DI,DI
```

```
            MOV     BX,LMCSD        ;COMPUTE UPPER LIMIT OF RAM
            MOV     CL,4
            SHL     BX,CL           ;CANNOT BE > OFFFFH
            OR      BX,002EH        ;RAM COUNT
            MOV     AX,0FFFFH
            MOVE    DX,55AAH
            CLD                     ;INCREMENT FLAG
            MOV     CX,BX           ;COUNT
            REP     STOSB           ;FILL RAM WITH FIRST PATTERN
STRT3:      DEC     DI              ;POINT TO LAST BYTE
            STD                     ;DECREMENT FLAG
STRT4:      MOV     SI,DI
            MOV     CX,BX
STRT5:      LODSB                   ;READ PATTERN STORED
            XOR     AL,AH           ;TEST IF OK
            JNE     STERR           ;TEST NOT OK
            CMP     AH,0
            JE      STRT6           ;ZERO PATTERN
            MOV     AL,DL
            STOSB                   ;WRITE NEXT PATTERN
STRT6:      LOOP    STRT5           ;CONTINUE UNTIL ALL OF RAM TEST
            CMP     AH,0
            JE      STRT7           ;RAM TEST COMPLETE
            MOV     AH,AL           ;ROTATE PATTERN
            XCHG    DH,DL
            CLD                     ;INCREMENT FLAG
            INC     DI              ;POINT TO START BYTE
            JZ      STRT4           ;READ/WRITE FORWARD
            DEC     DI              ;READ/WRITE BACKWARD
            MOV     DX,1            ;00 AND 01 PATTERN
            JMP     STRT3
                                    ;INITIALIZE SEGMENT REGISTER & STACK
STRT7       MOV     AX,DATA
            MOV     DS,AX
            MOVE    AX,EPRM
            MOV     ES,AX
            MOVE    AX,STACK
            MOV     SS,AX
            MOV     SP,OFFSET STACKT
                                    ;INITIALIZE THE CHIP SELECT
                                    CONTROLLER
            MOV     DX,LMCSR        ;LOWER MEMORY CHIP SELECT
            MOVE    AX,LMCSD        ;16K at 0 - 3FFFH
            OUT     DX,AX
            MOV     DX,PACSR        ;PERIPHERAL CHIP SELECT
            MOV     AX,PACSD
            OUT     DX,AX
            MOV     DX,MMCSR        ;MID-RANGE MEMORY CHIP SELECT
            MOV     AX,MMCSD        ;16K AT E0000H
            OUT     DX,AX
            MOV     DX,MPCSR        ;MID-RANGE MEMORY SIZE
            MOV     AX,MPCSD
            OUT     DX,AX
                                    ;INITIALIZE 8155 - A
            MOV     DX,A8155CS      ;CONTROLS CLOCK, KEYBOARD, DISPLAY
            MOV     AL,A8155CD      ;PORT A,B,C OUTPITS, NO TIMER
            OUT     DX,AL
            INC.    DX              ;PORT A ADDRESS
            MOV     AL,A8155DA      ;ALL OUTPUTS HIGH
            OUT     DX,AL
            INC     DX              ;PORT B ADDRESS
            OUT     DX,AL
            INC     DX              ;PORT C ADDRESS
            OUT     DX,AL
            INC     DX              ;TIMER LOW COUNT ADDRESS
            MOV     AL,A8155TD      ;NO TIME
            OUT     DX,AL
            INC     DX              ;TIMER HIGH COUNT ADDRESS
            OUT     DX,AL

;INITIALIZE 8155 - B
            MOV     DX,B8155CS      ;MONITORS DIP SWITCHES
            MOV     AL,B8155CD      ;PORT A INPUTS, B&C OUTOUTS, NO TIMER
```

```
              OUT      DX,AL
              INC      DX              ;PORT A ADDRESS
              MOV      AL,B8155DA      ;ALL INPUTS HIGH
              OUT      DX,AL
              INC      DX              ;PORT B ADDRESS
              OUT      DX,AL           ;ALL OUTPUTS HIGH
              INC      DX              ;PORT C ADDRESS
              OUT      DX,AL
              INC      DX              ;TIMER LOW COUNT ADDRESS
              MOV      AL,B8155TD      ;NO TIME
              OUT      DX,AL
              INC      DX              ;TIMER HIGH COUNT ADDRESS
              OUT      DX,AL
;$$$NO PROGRAM YET$$$                  ;INITIALIZE THE DMA CONTROLLER
;$$$NO PROGRAM YET$$$                  ;INITIALIZE THE TIME CONTROLLER
;$$$NO PROGRAM YET$$$                  ;INITIALIZE THE INTERRUPT CONTROLLER
              CALL     CLKINT          ;INITIALIZE CLOCK
              CALL     DSPINT          ;INITIALIZE DISPLAY
              CALL     JPRTINT         ;INITIALIZE JOURNAL PRINTER
              CALL     CPRTINT         ;INITIALIZE CHECK PRINTER
                                       ;SET UP INTERRUPT VECTOR TABLE
              MOV      ES:NMIPTR,OFFSET NMI
              MOV      ES:NMIPTR+2, CODE
              MOV      ES:TMROPTR,OFFSET TMRO
              MOV      ES:TMROPTR+2, CODE
              MOV      ES:DMAOPTR, OFFSET DMA0
              MOV      ES:DMAOPTR+2,CODE
              MOV      ES:DMA1PTR,OFFSET DMA1
              MOV      ES:DMA1PTR+2,CODE
              MOV      ES:INTOPTR,OFFSET INTO
              MOV      ES:INTOPTR+2,CODE
              MOV      ES:CLCKPTR,OFFSET CLCK
              MOV      ES:CLCKPTR+2,CODE
              MOVE     ES:INT2PTR,FFSET INT2
              MOV      ES:INT2PTR+2,CODE
              MOV      ES:INT3PTR,OFFSET INTO
              MOV      ES:INT3PTR+2,CODE
              MOV      ES:TMR1PTR,OFFSET TMR1
              MOV      ES:TMR1PTR+2,CODE
              MOV      ES:TMR2PTR,OFFSET TMR2
              MOV      ES:TMR2PTR+2,CODE

CALL     DSPCLR          ;CLEAR DISPLAY
              CLD                      ;FILL KEYBOARD BUFFER WITH SPACES
              MOV      DI,OFFSET KBFR
              MOVE     CX,SKBFR
              MOV      AL,20H
        REP   STOSB
              STI                      ;ENABLE INTERRUPTS
STRT9:        CALL     RMDCK           ;CHECK RMOD
              CALL     KEYB            ;SCAN KEYBOARD
              CALL     PWRCK           ;CHECK FOR POWER DOWN
              JMP      STRT8           ;LOOP FOREVER
CODE    ENDS

;POWER ON RESET VECTOR - LOCATED AT 0FFFFF0H
RESET   SEGMENT AT 0FFFFH
        MOV      DX,UMCSR       ;UPPER MEMORY CHIP SELECT
        MOV      AX,UMCSD       ;8K AT FE000H
        OUT      DX,AX
        JMP      FAR PTR START
        DB       'RM00'
RESET ENDS
        END

CRO Asembler 03-05-84  Page 1-3

INT VECTOR 3 - NON MASKABLE INTERRUPT - RMOD INTERLOCK

Page

;NMI     PROCEDURE-REENTRANT, NONMASKABLE INTERRUPT
        ;           ENTRY-INTERRUPT 2
        ;           EXIT-RMODS=1 - OPEN
                 PUBLIC NMI
```

```
        NMI     PROC            NEAR
                PUSH            BP
                MOV             BP, SP      ;ESTABLISH BASE POINTER
                PUSH            BX
                PUSH            AX
                PUSHF
                MOV             BX,OFFSET RMODS  ;WRITE RMOD OPEN
                                                    INDICATOR
                MOV             AL,01H
                CALL            WEEPRM      ;WRITE TO EEPROM ONE
                                                    BYTE
                POPF
                POP             AX
                POP             BX
                POP             BP
                IRET
        NMI     ENDP
        SUBTTL                  INTO - INTERRUPT 0
```

```
        TITLE   RMDCK - CHECK RMOD STATUS REGISTERS
                PAGE            66,132
        CGROUP  GROUP           CODE, CONST, RESET
        CGROUP  GROUP           INTV, STACK,D ATA
        EGROUP  GROUP           PRM

EPRM    SEGMENT         PUBLIC EPRM
                EXTRN           RMODS:BYTE, CKPRS:BYTE
                EXTRN           JRPRS:BYTE, KEYBS:BYTE, LCCKC:BYTE
                EXTRN           LOCK:BYTE
        EPRM    ENDS

CODE    SEGMENT PUBLIC CODE
        ASSUME  CS:CGROUP, DS:DGROUP, SS:DGROUP,ES:EGROUP
                EXTRN           WEEPRM:NEAR

;RMDCK PROCEDURE - CHECK ALL VITAL RMOD STATUS REGISTERS
        ;       IF RMOD WAS OPENED                      - RMODS=1 OR
        ;       IF ERROR COUNT EQUALS MAXIMUM           - LOCKC=LOCK
        ;       THEN MONEY ORDER PRINTER IS DISABLED    - CKPRS=1AND
        ;         JOURNAL PRINTER IS DISABLED           - LRPRS=1AND
        ;         KEYBOARD IS LOCKED                    - KEYBS=1
                PUBLIC RMDCK
        RMDCK   PROC            NEAR
                XOR             AL,AL
                TEST            RMODS,01H       ;TEST RMOD FOR OPEN
                JNZ             RMDCK1          ;OPEN
                MOV             AH,LOCKC        ;ERROR COUNT
                CMP             AH,LOCK         ;MAXIMUM ERROR COUNT
                JB              RMDCK2          ;MAXIMUM ERROR COUNT
                                                    NOT REACHED
        RMDCK1: INC     AL
        RMDCK2: MOV     BX,OFFSET CKPRS ;MONEY ORDER PRINTER-
                                                0=ENABLE,1=DISABLE
                CALL    WEEPRM
                INC     BX      ;JOURNAL PRINTER - 0=ENABLE,1=DISABLE
                CALL    WEEPRM
                INC     BX      ;KEYBOARD        - 0=ENABLE,1=LOCKED
                CALL    WEEPRM
                RET
        RMDCK   ENDP
        CODE    ENDS
                END
```

```
        TITLE           KEYB - KEYBOARD MODULE
                PAGE    66,132

DATA    SEGMENT OUBLIC 'DATA'
        EXTRN   MOVP:BYTE TOTS:BYTE DSPR:BYTE  SHFT:BYTE FEEC:BYTE
        EXTRN   KEY:BYTE  KEYP:BYTE KEYT:BYTE  KEYD:BYTE
```

```
        EXTRN     KNDG:BYTE   KCMD:BYTE    KPCMD:BYTE
        EXTRN     KENTN:BYTE  KENTP:WORD
        EXTRN     KNBR:BYTE   KFLD:BYTE    KLCK:BYTE
        EXTRN     KDSP:BYTE   KONT:BYTE    KTPE:BYTE
        EXTRN     KLLMT:DWORD              KULMT:DWORD
        EXTRN     KPTR:DWORD  KBIN:DWORD   KBPTR:DWORD
        EXTRN     CHR:BYTE    CMIN:BYTE    CSEC:BYTE
        EXTRN     CSCRTY:WORD
        EXTRN     CSACC:DWORD              CXNBR:DWORD  CSCHK:BYTE
        EXTRN     CID:BYTE    CIDL:BYTE
        EXTRN     CCNT:WORD   CAMT:DWORD   DFEE:DWORD   CTOT:DWORD
        EXTRN     DFIDT:DWORD
        EXTRN     CMCNT:WORD  CMAMT:DWORD
        EXTRN     CVCNT:WORD  CVAMT:DWORD
        EXTRN     CTCNT:WORD  CTAMT:DWORD
        EXTRN     KBFR:BYTE   DBFR:BYTE    SCRTCH:BYTE
DATA    ENDS

EPRM    SEGMENT   PUBLIC 'EPRM'
        EXTRN     SCRTY:WORD
        EXTRN     STACC:WORD  STSTE:BYTE  STSUB:BYTE   STDIV:WORD  STSTR:WORD
        EXTRN     MONTH:BYTE  DATE:BYTE   YEAR:BYTE
        EXTRN     PHONE:BYTE
        EXTRN     USE:BYTE                ID:BYTE
        EXTRN     FEELMT:DWORD            FEEAMT:DWORD
        EXTRN     MCNTC:WORD              MCNTM:WORD
        EXTRN     MAMTC:DWORD             MAMTM:DWORD
        EXTRN     VCNTC:WORD              VCNTM:WORD
        EXTRN     VAMTC:DWORD             VAMTM:DWORD
        EXTRN     BLANKS:BYTE             TRANS:BYTE   LOOK:BYTE
        EXTRN     BSACC1:WORD   BSNBS1:DWORD    BSCHK1:BYTE
        EXTRN     ESACC1:WORD   ESNBR1:DWORD    ESCHK1:BYTE
        EXTRN     BSACC2:WORD   BSNBR2:DWORD    BSCHK2:BYTE
        EXTRN     ESACC2:WORD   ESNBR2:DWORD    ESCHK2:BYTE
        EXTRN     RMODS:BYTE    MODMS:BYTE      CKPRS:BYTE
        EXTRN     JRPRSL:BYTE   KEYBS:BYTE      LOCKS:BYTE
EPRM    ENDS

CODE    SEGMENT   PUBLIC 'CODE'
        EXTRN     PWRON:NEAR
        EXTRN     WEEPRM:NEAR
        EXTRN     TRNS:NEAR
        EXTRN     DISP:NEAR   JPRT:NEAR   CPRT:NEAR
        EXTRN     ASCBN:NEAR  BNASC:NEAR
        EXTRN     DPCMP:NEAR  DPADD:NEAR  DPSUB:NEAR   DPMUL:NEAR   DPDIV:NEAR
CODE    ENDS

DGROUP    GROUP       CODE, CONST, RESET
        DGROUP    GROUP       INIV, STACK DATA
CODE    SEGMENT   PUBLIC 'CODE'

RO Assembler 03-06-84              Page 1-2

ASSUE CS:CGROUP, DS:GROUP, SS:DGROUP, ES:EGROUP

;KEYBOARD CONSTANTS

NID       EQU       20           ;NUMBER OF IDENTIFICATION CODES
NFEE      EQU       20           ;NUMBER OF FEES
NTR       EQU       16           ;NUMBER OF TRANSACTIONS PER
                                 CUSTOMER/VENDOR
SKBFR     EQR       16           ;SIZE OF KEYBOARD BUFFER
SDBFR     EQU       16           ;SIZE OF DISOLAY BUFFER
KBDCS     EQU       300H         ;KEYBOARD COMMAND/STATUS ADDRESS
KBDCD     EQU       00DH         ;PORT A & C OUTPUT, B INPUT
KBDRS     EQU       0FBH         ;ROW 1 SELECT
KBDRM     EQU       00FH         ;READ MASK
KNKEY     EQU       24           ;NUMBER OF KEYS
KNROW     EQU       6            ;NUMBER OR ROWS
KNCOL     EQU       4            ;NUMBER OF COLUMNS
KDBNC     EQU       4            ;BEBOUNCE CONSTANT
KBYTE     EQU       1            ;BYTE ENTRY
KWORD     EQU       2            ;WORD ENTRY
KDWRD     EQU       3            ;DWORD ENTRY
```

```
KREAL       EQU     4               :REAL ENTRY
KALPHA      EQU     5               :ALPHA ENTRY
KEY0        EQU     00H             :0
KEY1        EQU     01H             :1
KEY2        EQU     02H             :2
KEY3        EQU     03H             :3
KEY4        EQU     04H             :4
KEY5        EQU     05H             :5
KEY6        EQU     06H             :6
KEY7        EQU     07H             :7
KEY8        EQU     08H             :8
KEY9        EQU     09H             :9
KEVEN       EQU     0AH             :ENTER
KEVVD       EQU     0BH             :VOID
KEYST       EQU     0CH             :START
KEYNF       EQU     0DH             :NO FEE
KEYID       EQU     0EH             :ID
KEYMO       EQU     0FH             :MONEY ORDER
KEYTX       EQU     10H             :TRANSMIT
KEYDF       EQU     11H             :DEFINE
KEYVP       EQU     12H             :VENDOR PAYMENT
KEYTO       EQU     13H             :TOTAL
KEYLD       EQU     14H             :LOAD
KEYDY       EQU     15H             :DAY/SHIFT
KEYDS       EQU     16H             :DISPLAY
KEYBR       EQU     17H             :PRINT
KEYDATA     DB      KEYLD           :KEY CODE TABLE
            DB      KEYDY
            DB      KEYDS
            D       KEYPR
            DB      KEYTX
            DB      KEYDF
            DB      KEYBP
            DB      KEYTO
            DB      KEYST
            DB      KEYNF
            DB      KEYID
            DB      KEYMO
            DB      KEY6
            DB      KEY3
            DB      KEYEN
```

CRO Assembler 03-06-84          Page 1-3

```
            DB      KEY8
            DB      KEY5
            DB      KEY2
            DB      KEY0
            DB      KEY7
            DB      KEY4
            DB      KEY1
            DB      KEYVD
KEYJT       DW      KENT            :KEYBOARD JUMP TABLE
            DW      KVOID
            DW      KSTRT
            DW      KNFEE
            DW      KID
            DW      KMO
            DW      KTRNS
            DW      KDEFN
            DW      KVP
            DW      KTOTL
            DW      KLOAD
            DW      KSHFT
            DW      KDISP
            DW      KPRNT
:DATA ENTRY AND DISPLAY TABLES
:NUMBER OF DATA ITEMS TO BE ENTERED
:16 CHARACTER DISPLAY
:NUMBER OF POSSIBLE ENTRIES PER DATA ITEM
:NUMBER OF FIELDS
:NUMBER OF ERRONEOUS ENTRIES BEFORE RMOD LOCKS
:DISPLAY START OF ENTRY - 0=NO DISPLAY
:NUMBER OF CHARACTERS PER DISPLAY - 0=NONE ALLOWED
:TYPE OF DATA - 1=BYTE, 2=WORD, 3=DWORD, 4=REAL, 5=ALPHA
:LOWER LIMIT - 0=NO LIMIT CHECK, FFFFFFFF=CHECK AGAINST ARRAY
```

```
            IN UPPER LIMIT
:UPPER LIMIT
:DATA STORAGE POINTER
KSTRTN     EQU      2                    :START OF DAY KEYBOARD DATA
KSTRTD     DB       'ID              ',20,1,5

DB       14,3,1
           DD       0FFFFFFFFH,ID
           DD       CIDL
           DB       'BEG#            ',1,3,0

DB       6,3,2
           DD       0FFFFFFFFH,BSACC1
           DD       CSACC
           DB       9,6,3
           DD       0FFFFFFFFH,DBNBR1
           DD       CSNBR
           DB       16,12,1
           DD       0FFFFFFFFH,BSCHK1
           DD       CSCHK
           DD       0FFFFFFFFH,SCRTY
           DD       CSCRTY'       DB
'DIAL TELELPHOHE #',0,0,0

DB       0,0,0
           DD       0,0

DD       TRNS
           DB       'DISCONNECT RMOD ',0,0,0

DB       0,0,0
           DD       0,0

DD       0
EFNN       EQU      19               :DEFINE KEYBOARD DATA-ENTERED BY
                                      MANAGER
EFND       DB       'SECURITY#       ',1,1,0

DB       0,5,2
           DD       0,0

DD       SCRTY
           DB       'ST              ',1,5,0

DB       3,3,2
           DD       0,0

DD       STACC
           DB       6,2,1
           DD       0,0

DD       STSTE
           DB       8,2,1
           DD       0,0

DD       STSUB
           DB       10,3,2
           DD       0,0

DD       STDIV
           DB       13,4,2
           DD       0,0

DD       STSTR
           DB       'DATE    /  /  ',1,3,0
           DD       MONTH
           DB       12,2,1
           DD       1,31

DD       DAY
           DB       15,2,1
           DD       0,0
```

```
DD      YEAR
DB      'TIME         :  ',1,3,0

DB      9,2,1
DD      0,24

DD      CHR
DB      12,2,1
DD      0,59

DD      CMIN
DB      15,2,1
DD      0,59

DD      CSEC
DB      'PHNE         ',1,1,0

DB      6,11,5
DD      0,0

DD      PHONE
DB      'ID USE       ',1,1,0

DB      16,1,1
DD      0,2

DD      USE
DB      'ID           ',20,1,0

DB      14,3,1
DD      0,255

DD      ID
DB      'FE           ',20,2,0

DB      2,3,4
DD      0,99999999

DD      FEELMT
DB      12,4,4
DB      'CST MO#      ',0,1,0
```

D Assembler 03-06-84            PAGE 1-6

```
DB      12,5,2
DD      0,0

DD      MCNTC
DB      'MCH MO#      ',0,1,0

DB      12,5,2
DD      0,0

DD      MCNTM
DB      'CST MO$      ',0,1,0

DB      8,8,4
DD      0,0

DD      MAMTC
DB      'MCH MO$      ',0,1,0

DB      8,8,4
DD      0,0
```

```
         DD      MAMTM
         DB      'VND CK#         ',0,1,0

DB      12,5,2
         DD      0,0

DD      VCNTC
         DB      'MCH CK#         ',0,1,0

DB      12,5,2
         DD      0,0

DD      VCNTM
         DB      'VND CK$         ',0,1,0

DB      8,8,4
         DD      0,0

DD      MAMTC
         DB      'MCH CK$         ',0,1,0
         DD      0,0

DD      VAMTM
```

RO Assembler 03-06-84         Page 1-7

```
         DB      'WARN # BLANKS   ',0,1,0

DB      15,2,1

DD      0,0
         DB      'WARN # TRANS    ',0,1,0

DB      15,2,1
         DD      0,0

DD      TRANS
         DB      'LOCK # ERRORS   ',0,1,0

DB      15,2,1
         DD      0,0

DD      LOCK
KLOADN   EQU     3
KLOADD   DB      'SECURITY #      ',1,1,5

DB      0,5,2
         DD      0FFFFFFFFH,SECRTY
         DD      CSCRTY
         DB      'BEG#            ',1,3,0

DB      6,3,2
         D       0FFFFFFFFH,STACC
         DD      BSACC2
         DB      9,6,3
         DD      0,0

DD      BSNBRS2
         DB      16,1,1
         DD      0,0

DD      BSCHK2
         DB      'END#            ',1,3,0

DB      6,3,2
         DD      0FFFFFFFFH,STACC
         DD      SACC2
         DB      9,6,3
         DD      0,0
```

KEYBOARD MONITOR PROCEDURE

```
            PAGE
;KEYBOARD MONITOR PROCEDURE
            PUBLIC      KEYB
KEYB        PROC        NEAR
            MOV         AL,KEYBS        ;$$$SECURITY CHECK$$$
            XOR         AL,AL
            JNZ         KEYB0           ;$$$KEYBOARD LOCKED$$$
            CALL        KEYSC           ;SCAN KEYBOARD FOR KEY
                                         DEPRESSED
            CMP         AL,KNKEY
            JL          KEYB1
KEYB0:      RET                         ;NO KEY OR NON-EXIST KEY
KEYB1:      XOR         CX,CX
            CMP         AL,10
            JL          KNMBR           ;NUMBER 0-9
            XCHG        KCMD,AL         ;ROTATE COMMANDS
            MOV         KPCMD,AL        ;SAVE PREVIOUS COMMAND
            SUB         AL,10
            MOV         CL,AL
            PUSH        CX              ;SAVE JUMP TABLE INDEX
            MOV         CL,KCNT         ;NUMBER OF DIGITS ALLOWED
            CMP         KNDG,0          ;NUMBER OF DIGITS ENTERED
            JZ          KEYB4           ;NO DATA ENTERED
            MOV         DI,KPTR         ;OFFSET OF DATA STORAGE IF ANY
            MOV         SI,OFSET KBIN   ;TEMPORARY BINARY STORAGE
            MOV         BX,OFFSET SCRTCH
            MOV         AX,KBPTR        ;OFFSET OF DATA ENTERED
            CMP         KTPE,KALPHA     ;CHECK DATA TYPE
            JE          KEYB2           ;ALPHA
            PUSH        AX              ;SAVE KEYBOARD BUFFER ADDRESS
            PUSH        SI
            PUSH        BX
            PUSH        CX
            CALL        ASCBN           ;CONVERT TO BINARY
            PUSH        SI              ;POINTER TO CONVERTED BINARY
                                         NUMBER
            MOV         AX,OFFSET KLLMT
            PUSH        AX              ;LOWER LIMIT
            CALL        DPCMP           ;COMPARE
            SAL         AX,1
            JC          KEYB5           ;ERROR-NUMBER/LOWER LIMIT
            MOV         AX,OFFSET KULMT
            PUSH        AX              ;UPPER LIMIT
            PUSH        SI              ;CONVERTED BINARY NUMBER
            CALL        DPCMP           ;COMPARE
            SAL         AX,1
            JC          KEYB5           ;ERROR-UPPER LIMIT/NUMBER
            MOV         CL,KTPE
            CMP         CL,KDWRD
            JNE         KEYB2
            INC         SX              ;ADJUST DWORD COUNT
KEYB2:      MOV         AX,DS           ;TRANSFER DATA ENTERED
            CMP         KPTR+2,AX
            JE          KEYB3           ;DESTINATION=EE PROM
            MOV         BX,KPTR
KEYB2A      LODSB
            CALL        WEEPRM          ;DESTINATION=EE PROM
            INC         BX
            LOOP        KEYB2A
KEBY3:      OR          AX,AX
            JE          KEYB4           ;NO TRANSFER, LEAVE IN KBIN
REP         MOVSB
```

RO Assembler 03-006-84            Page 1-10

KEYBOARD MONITOR PROCEDURE

```
KEYB4:      POP         BX              ;RETRIEVE JUMP TABLE INDEX
            SHL         BX,1            ;COMPUTE JUMP ENTRY
            JMP         KEYJT [BX]      ;PROCESS KEY
KEYB5:      POP         BX
            CALL        KERR
            RET
```

```
KNMBR:    ADD       AL,30H              ;CONVERT TO ASCII
          CLD
          MOV       SI,OFFSET KBFR+1
          MOV       DI,OFFSET KBFRR
          MOV       CX,SKBFR-1
          REP       MOVSB               ;ROTATE KBFR TO LEFT
          STOSB                         ;ADD NEW CHARACTER TO RIGHT
          INC       KNDG                ;DIGIT COUNT
          CMP       KDSP,0              ;CHECK FOR DISPLAY
          JZ        KNMBR3              ;NO DISPLAY ALLOWED
          MOV       DI,OFFSET DBFR-1
          XOR       CH,CH
          MOV       CL,KDSP
          ADD       DI,CX
          MOV       SI,OFFSET KBFR+SKBFR
          MOV       CL,KCNT
          SUB       SI,CX
          MOV       KBPTR,SI            ;SAVE KBFR OFFSET
          PUSH      DI                  ;SAVE START OF DISPLAY
          PUSH      CX                  ;SAVE NUMBER OF CHARACTERS IN
                                         DISPLAY
          MOV       BL,KTPE             ;TUPE OF ENTRY BEING PROCESSED
          CMP       BL,KREAL
          JNE       KNMBR1
          POP       CX
          INC       CX                  ;ADD DECIMAL POINT TO COUNT
          PUSH      CX
          SUB       CX,3                ;REAL ENTRY
KNMBR1:
          REP       MOVSB               ;MOVE KBFR TO DBFR
          CMP       BL,KREAL            ;CHECK FOR REAL ENTRY
          JNE       KNMBR2
          MOV       AL,','              ;REAL ENTRY
          STOSB
          MOV       CL,2                ;MOVE FRACTION
          REP       MOVSB
KNMBR2:   MOV       AK,DKSP             ;START OF MESSAGE (1-16)
          MOV       AL,05H              ;CURSOR LINE, ON
          PUSH      AX
          CALL      DISP
KNMBR3:   RET
KENTR:    NGP                           ;ENTER KEY - $$$NO PROGRAM$$$
KVOID:    MOV       AH,MOVP             ;VOID KEY
          MOV       AL,TOTS             ;TOTAL STATUS
          CMP       AH,1
          JE        KOID1               ;MONEY ORDER VOID
          CMP       AH,2
          JE        KVPOID2             ;VENDOR PAYMENT VOID
          CALL      KERR                ;ERROR-CLEAR ENTRY & BEEP
          RET
KVOID2:   MOV       SI,OFFSET CVCNT     ;VENDOR PAYMENT VOID
          MOV       DI,OFFSET CVAMT
KVOID3:   BX,BX                         ;CAMT,CFEE INDEX
```

KEYBOARD MONITOR PROCEDURE

```
          MOV       CX,CCNT             ;# OF MO/VP ENTERED
          CMP       AL,0
          JNE       KVOID4              ;TOTAL KEY DEPRESSED, VOID
                                         ALL
          MOV       AL,4                ;VOID LAST ENTRY
          DEC       CL
          MUL       CL
          MOV       BX,AX
          MOV       CL,1
KVOID4:   PUSH      CX                  ;# OF ENTRIES TO BE VOIDED
KVOID5:   DEC       CCN                 ;REDUCE COUNT
          DEC       CVCNT
          CMP       TOTS,1
          JNZ       KVOID6
          DEC       CTCNT               ;REDUCE TOTAL TRANSACTIONS
KVOID6:   LOOP      KVOID5
          POP       CX
          PUSH      CX
          PUSH      DI                  ;SAVE CMAMT/CVAMT OFFSET
```

```
KVOID7:  MOV    SI,OFFSET CAMT
         ADD    SI,BX
         MOV    DI,OFFSET CTOT
         PUSH   SI
         PUSH   DI
         CALL   DPSUB              ;CTOT=CTOT-MO/VP
         CMP    MOVP,1
         JNE    KVOID9
         PUSH   SI                 ;REDUCE FEES
         CMP    TOTS,0
         JE     KVOID8
         MOV    SI,OFFSET CFEE     ;SUBTRACT FEE FROM CTOT
         ADD    SI,CX
         PUSH   SI
         PUSH   DI
         CALL   DPSUB              ;CTOT=CTOT-CFEE
KVOID8:  XOR    AX,AX              ;ZERO FEE
         MOV    [SI],AX
         MOV    [SI+2],AX
         POP    SI
KVOID9:  POP    DI
         POP    SI
         PUSH   DI
         CALL   DPSBU              ;CMAMT/CVAMT=CMAMT/CVAMT-MO/VP
         POP    DI
         CMP    TOTS,1
         JNZ    KVOID10
         MOV    DI,OFFSET CTAMT    ;REDUCE TOTAL AMOUNT
         PUSH   SI
         PUSH   DI
         CALL   DPSUB
KVOID10: POP    DI
         XOR    AX,AX
         MOV    [SI],AX            ;ZERO CAMT
         MOV    [SI+2],AX
         INC    BX
         INC    BX
         JZ     KSTRT1             ;SECOND START KEY
         CALL   PWRON              ;POWER ON
         RET

RO Assembler 03-06-84              Page 1-12

KEYBOARD MONITOR PROCEDURE

KSTRT1:  MOV    AL,KSTRTN          ;START DATA
         MOV    SI,OFFSET KSTRTD
         CALL   KINIT              ;INITIALIZE KEYBOARD AND
                                   ;DISPLAY VARIABLES
         RET
KNFEE:   MOV    FEEC,1             ;NO FEE KEY - FECC=1
         RET
KID:     MOV    SI,OFFSET KBIN     ;ID KEY
         LODSB
         MOV    CID,AL
         PUSH   ES                 ;CHECK FOR VALID ID
         MOV    AX,EPRM
         MOV    DI,OFFSET ID       ;EEPROM ADDRESS
         MOV    CX,NID             ;NUMBER OF IDS
         REPNE  SCASB
         POP    ES
         JB     KID1
         MOV    CID,0              ;ZERO CURRENT ID
         CALL   KERR               ;ERROR-WIPE OUT ENTRY AND
                                   ;BEEP
KID1:    RET                       ;MATCH FOUND
KMO:     MOV    SI,OFFSET KBIN     ;MONEY ORDER KEY
         MOV    DI,OFFSET CTOT
         PUSH   SI
         PUSH   DI
         CALL   DPADD              ;CTOT=CMAMT+AMT ENTERED
         MOV    DI,OFFSET CMAMT
         PUSH   SI
         PUSH   DI
         CALL   DPADD              ;CMAMT=CMAMT+AMT ENTERED
```

```
         PUSH    ES
         MOV     AX,EPRM
         MOV     ES,AX
         MOV     DI,OFFSET MONTC    ;EEPROM ADDRESS
         MOV     AX,CCNT
         CMP     AX,NTR             ;CHECK NUMBERS
         JGE     KMOE               ;MONEY ORDERS EXCEEDED PER
                                     SYSTEM
         CMP     AX,ES:WORD PTR[DI]
         JGE     KMOE               ;MONEY ORDERS EXCEEDED PER
                                     MACHINE
         MOV     SI,OFFSET CTOT     ;CHECK AMOUNT PER CUSTOMER
         ADD     DI,2
         PUSH    SI
         PUSH    DI
         CALL    DPCMP              ;COMPARE TWO DOUBLE
                                     PRECISION NUMBERS
         CMP     AL,1
         JE      KM04               ;CTOT MAX AMT PER CUSTOMER
         MOV     SI,OFFSET CMAMT    ;CHEC AMOUNTS PER MACHINE
         ADD     DI,4
         PUSH    SI
         PUSH    DI
         CALL    DPCMP              ;COMPARE TWO DOUBLE
                                     PRECISION NUMBERS
         CMP     AL,1
KMOE:    POP     ES                 ;KEYBOARD ERROR
         CALL    KERR               ;ERROR - CLEAR ENTRY & BEEP

RO Assembler 03-06-84              Page 1-13

KEYBOARD MONITOR PROCEDURE

KM00:    MOV     MOVP,1             ;MO/VP INDICATOR
         INC     CONT
         INC     CMONT
         MOV     AL,4
         MUL     BL
         MOV     BX,AX              ;CAMT & CFEE INDEX
         MOV     AX,KBIN            ;LOW BYTES OF MO
         MOV     CAMT[BX],AX
         MOV     AX,KBIN+2          ;HIGH BYTES OF MO
         MOV     CAMT[BX],AX
         MOV     AL,FEEC            ;CHECK IF FEE IS TO BE
                                     COMPUTED
         CMP     AL,0
         JE      KM03               ;NO FEE
         PUSH    ES
         MOV     AX,EPRM
         MOV     ES,AX
         MOV     SI,OFFSET KBIN     ;FIND FEE
         MOV     DI,OFFSET FEELMT-9
         MOV     CX,NFEE
KM01:    ADD     DI,8               ;$$$ORDER CHANGED$$$
         PUSH    SI
         PSUH    DI                 ;$$$WRONG SEGMENT$$$
         CALL    DPCMP              ;COMPARE TWO DOUBLE
                                     PRECISION NUMBERS
         CMP     AX,1
         JNE     KM02               ;FEE FOUND-MONEY ORDER
                                     $<=$BREAKPOINT
         LOOP    KM01               ;NEXT FEE
KN02:    ADD     DI,4               ;FEE ADDRESS
         MOV     AX,ES:WORD PTR[DI]
         MOV     CFEE[BX],AX
         ADD     DI,2
         MOV     AX,ES:WORD PTR[DI]
         MOV     CFEE+20BX1,AX
         POP     ES
KM03:    RET
KM04:    POP     ES                 ;AMOUNTS EXCEEDED-SUBTRACT
                                     LAST AMOUNTS
         MOV     SI,OFFSET KBIN
         MOV     DI,OFFSET CTOT
```

```
                PUSH    SI
                PUSH    DI
                PUSH    SI
                CALL    DPSUB           ;CTOT=CMAMT--AMT ENTERED
                PUSH    ES
                CALL    DPSUB           ;CMAMT=CMAMT-AMT ENTERED
                PUSH    ES
                JMP     KMOE            ;ERROR
KTRNS:          MOV     AL,KTRNSN       ;TRANSMIT KEY
                MOV     SI,OFFSET KTRNSD
                CALL    KINIT           ;INITIALIZE KEYBOARD &
                                        DISPLAY VARIABLES
                RET
KDEFN:          MOV     AL,KDEFNN       ;DEFINE KEY
                MOV     SI,OFFSET KDEFND
                CAL     KINIT           ;INITIALIZE KEYBOARD &
                                        DISPLAY VARIABLES
                MOV     DI,OFFSET CTOT  ;ZERO CURRENT TOTAL
                XOR     AX,AX
                STOSW

RO Assembler 03-06-84           Page 1-14

KEYBOARD MONITOR PROCEDURE

STOSW
                MOV     AL,MOVP
                JE      KTOTL6          ;DISPLAY OR PRINT TOTALS
                CMP     AL,2
                JE      KTOTL3          ;VENDOR PAYMENT TOTAL
                CMP     AL,1
                JE      KTOTL1          ;MONEY ORDER TOTAL
                CALL    KERR
                RET
KTOTL1:         MOV     CX,CONT         ;MONEY ORDER TOTAL
                MOV     SI,OFFSET CFEE-4
                MOV     DI,OFFSET CTOT
KTOTL2:         ADD     SI,4            ;FEE ADDRESS
                PUSH    SI
                PUSH    DI
                CALL    DPADD           ;ADD UP ALL FEES
                LOOP    KTOTL2
KTOTL3:         MOV     CX,CCNT         ;SUM TOTAL TRANSACTIONS
                AD      CTCNT,CX
                MOV     SI,OFFSET CAMT-4
                MOV     DI,OFFSET CTOT
KTOTL4:         ADD     SI,4
                PUSH    SI
                PUSH    DI
                CALL    DPADD
                LOOP    KTOTL4
                PUSH    DI
                MOV     SI,OFFSET CTAMT
                PUSH    SI
                CALL    DPADD           ;SUM MACHINE TOTAL
                MOV     SI,OFFSET MOTMSG ;MO TOT
                CMP     MOVP,1
                JE      KTOTL5
                MOV     SI,OFFSET VPTMSG ;VP TOT
KTOTL5:         MOV     DI,OFFSET DBFR
                PUSH    DI              ;DBER ADDRESS FOR DISPLAY
                MOV     CX,7
REP             MOVS    ES:BYTE PTR[DI],CS:[SI]
                MOV     SI,OFFSET CTOT  ;CONVERT TO ASCII & DISPLAY
                MOV     CX,OFFSET SCRTCH
                MOV     AH,9
                MOV     AL,KREAL
                PUSH    SI
                PUSH    DI
                PUSH    CX
                PUSH    AX
                CALL    BNASC           ;CONVERT TO ASCII
                MOV     AX,SDBFR
                PUSH    AX
                MOV     AX,120H         ;BLINKING DISPLAY, NO CURSOR
```

```
                PUSH    AX
                CALL    DISP            ;DISPLAY
                RET
KTOTL6:         NOR                     ;TOTAL DISPLAY/REPORTS-$$$NO PROGRAM$$$
                RET
KSHFT:          MOV     SHFT,1          ;DAY/SHIFT KEY
                RET
```

RO Assembler 03-06-84            Page 1-15

KEYBOARD MONITOR PROCEDURE

```
KDISP:          MOV     DSPR,1          ;DISPLAY KEY - DSPR=1
                RET
KPRNT:          MOV     DSPR,2          ;PRINT KEY - DSPR=2
                MOV     AL,MOVP
                CMP     AL,0
                JNZ     KPRNT1          ;MO/VP PRINT
                RET
KPRNT1:         MOV     AL,CKPRS        ;$$$ SECURITY CHECK $$$
                XOR     AL,AL
                JZ      KPRNT2          ;OK TO PRINT MONEY
                                         ORDERS/VENDOR PAYMENTS
                RET                     ;PRINTER DISABLED - IGNORE
                                         PRINT COMMAND
KPRNT2:         NOP                     ;PRINT CHECK - $$$ NO PROGRAM
                                         $$$
KEYB            ENDP
SUBTTL                  KEYBOARD INITIALIZATION PROCEDURE
```

```
;       ################################################################
;       ###  PRINTER DRIVER FOR RMOD. THIS PROGRAM ACCEPTS STRING   ###
;       ###  DATA AND TRANSFORMS IT INTO A LIST OF 'CELL SPECS'     ###
;       ###  WHICH ARE SORTED AND PROCESSED TO GENERATE A LINE AT A ###
;       ###  TIME OF PIXEL DATA TO DRIVE THE FOUR PRINT SOLENOIDS   ###
;       ###  OF A _____ DOT MATRIX PRINTER                      ###
;       ###  THE ALGORITHM IS EXPLAINED IN A SEPARATE DOCUMENT      ###
;       ###  TITLED '_____'                                 ###
;       ################################################################

STACK                   SEGMENT     PARA    STACK   'STACK'

STACK_BOTTOM            LABEL       WORD
                        ORG         OFFSET $+01FEH
STACK_TOP               LABEL       WORD
STACK                   ENDS

DATA                    SEGMENT     PARA    MEMORY  'DATA'

NEXT_CELL               LABEL       WORD
                        ORG         OFFSET $+2
TOTAL_CELLS             LABEL       WORD
                        ORG         OFFSET $+2
XCOORD                  LABEL       WORD
                        ORG         OFFSET $+2
YCOORD                  LABEL       WORD
                        ORG         OFFSET $+2
FONT                    LABEL       BYTE
                        ORG         OFFSET $+1
DIRECT                  LABEL       BYTE
                        ORG         OFFSET $+1
WDTH                    LABEL       BYTE
                        ORG         OFFSET $+1
HEIGHT                  LABEL       BYTE
                        ORG         OFFSET $+1
HSPACE                  LABEL       BYTE
                        ORG         OFFSET $+1
```

```
VSPACE              LABEL       BYTE
                    ORG         OFFSET $+1
IPT_OFFS            LABEL       WORD
                    ORG         OFFSET $+2
HORIZ               LABEL       WORD
                    ORG         OFFSET $+2
VERT                LABEL       WORD
                    ORG         OFFSET $+2
CSPECS_START        LABEL       WORD
                    ORG         OFFSET $+2
ACTIVE_CELL_TABLE   LABEL       WORD
                    ORG         OFFSET $+(2*3*65)
ACTIVE_LIST         LABEL       WORD
                    ORG         OFFSET $+2
THIS_ENT            LABEL       WORD
                    ORG         OFFSET $+2
NEXT_ENT            LABEL       WORD
                    ORG         OFFSET $+2
FREE_LIST           LABEL       WORD
                    ORG         OFFSET $+2
BACK                LABEL       WORD
                    ORG         OFFSET $+2
FWD                 LABEL       WORD
                    ORG         OFFSET $+2
NUMBER_ACTIVE       LABEL       BYTE
                    ORG         OFFSET $+1
SWAPPED             LABEL       BYTE
                    ORG         OFFSET $+1

;       THIS IS THE OUTPUT LINE BUFFER FOR SOLENOID DATA

BUFF                LABEL       BYTE              ; ROOM FOR 16 BYTES
                    ORG         OFFSET $+16       ; LAST 2 FOR OVERFLOW

BIT                 LABEL       BYTE              ; HOLDS POSITION IN SCANLINE
                    ORG         OFFSET $+1
SCANLINE            LABEL       WORD              ; HOLDS CURRENT SCANLINE
                    ORG         OFFSET $+2
PR_SHADOW           LABEL       BYTE
                    ORG         OFFSET $+1
SOL                 LABEL       BYTE              ; HOLDS VAL OF CURRENT
                    ORG         OFFSET $+1        ; SOLENOID
INSERTED            LABEL       WORD              ; NUMBER OF CSPECS WHICH
                    ORG         OFFSET $+2        ; HAVE BEEN MADE ACTIVE
NXT2CHK             LABEL       WORD              ; OFFSET OF NXT CSPEC
                    ORG         OFFSET $+2        ; TO EXAMINE

;       FOR SIMULATION PURPOSES THIS VARIABLE WILL REPRESENT
;       THE IO PORT WHICH CONTROLS THE PRINTER THIS WILL HAVE
;       TO BE CHANGED TO AN I/O INSTRUCTION WHICH WRITES TO AN
;       IO SEGMENT ADDRESS

PRINT_PORT          LABEL       BYTE
                    ORG         OFFSET $+1

;       TEST DATA- TO BE REMOVED AFTER DEBUGGING IS DONE
;       THIS SPECIFIES 3 STRINGS TO BE PRINTED

STRING_LIST         DB          3                 ;3 STRING DESCRIPTORS
                    DW          OFFSET STRING1
                    DW          OFFSET STRING2
                    DW          OFFSET STRING3
```

```
STRING1         DW              0                       ;X COORDINATE
                DW              0                       ;Y COORDINATE
                DB              AFONT                   ;STANDARD FONT
                DB              DOWN                    ;CHECK ORIENTATION
                DB              3                       ;CHARACTER COUNT
                DB              'ABC'                   ;THE STRING

STRING2         DW              0                       ;X COORDINATE
                DW              0                       ;Y COORDINATE
                DB              AFONT                   ;STANDARD FONT
                DB              RIGHT                   ;RECEIPT ORIENTATION
                DB              4                       ;NUMBER OF CHARS
                DB              'TX_J'                  ;THE STRING

STRING3         DW              25                      ;XCOORDINATE
                DW              10                      ;Y COORDINATE
                DB              AFONT                   ;STANDARD FONT
                DB              LEFT                    ;BACKWARDS DIRECTION
                DB              2                       ;CHAR COUNT
                DB              'HI'                    ;THIRD STRING

FREE_SPACE      LABEL           WORD                    ;SHOULD BE ENOUGH SPACE
                ORG             $+(50*8)                ;FOR 50 CELL SPECS
END_DATA        LABEL           WORD
DATA            ENDS

;******************************************************************************
;EQUATES
;******************************************************************************

MAX_ACTIVE_CELLS        EQU     64
SIZE_OF_ACT             EQU     65
CSPEC_SIZE_IN_BYTES     EQU     8

RIGHT                   EQU     0
LEFT                    EQU     1
UP                      EQU     2
DOWN                    EQU     3

;OFFSETS WITHIN AN ACTIVE CELL TABLE ENTRY.

ACT_CSPEC_INDEX         EQU     0
ACT_BACK_PTR            EQU     2
ACT_FWD_PTR             EQU     4

;OFFSETS WITHIN A CELL SPEC

CSPEC_SCANLINE          EQU     0
CSPEC_FMEMOFFS          EQU     2
CSPEC_WIDTH             EQU     4
CSPEC_HEIGHT            EQU     5
CSPEC_XBYTEOFFS         EQU     6
CSPEC_XBITOFFS          EQU     7

;OFFSETS WITHIN A FONT DESCRIPTOR

FDESC_WIDTH             EQU     0
FDESC_HEIGHT            EQU     1
FDESC_HSPACE            EQU     2
FDESC_VSPACE            EQU     3
FDESC_IPTOFFS           EQU     4
```

;OFFSETS WITHIN A STRING DESCRIPTOR

```
STDESC_XCOORD          EQU          0
STDESC_YCOORD          EQU          2
STDESC_FONT            EQU          4
STDESC_DIRECT          EQU          5
STDESC_COUNT           EQU          6
STDESC_CHARS           EQU          7

MAX_SCANS              EQU          700     ;NUM SCANLINES PER MONEY ORDR
BITS_PER_SCAN          EQU          240     ;WIDTH OF ONE SCANLINE IN DOTS

;EQUATES USED WITH PRINT SHADOW REGISTER    PR_SHADOW

SOL1                   EQU          01H
SOL2                   EQU          02H
SOL3                   EQU          04H
SOL4                   EQU          08H
NOT_SOLENOIDS          EQU          0F0H
MTRDRV                 EQU          010H
NOT_MTRDRV             EQU          0EFH
MTRSTP                 EQU          020H
NOT_MTRSTP             EQU          0DFH
CLAMP_ON               EQU          080H
CLAMP_OFF              EQU          07FH

AFONT                  EQU          0
BFONT                  EQU          1

CODE                   SEGMENT      WORD    PUBLIC 'CODE'

ASSUME       CS:CODE
          ASSUME       DS:DATA
          ASSUME       SS:STACK
```

;************************************************************************
; DRIVER ROUTINE :    THIS IS FOR DEBUGGING-SHOULD COME OUT LATER
;************************************************************************

```
TEST_STARTS:           MOV          AX,DATA
                       MOV          DS,AX

MOV          AX,STACK         ;SET UP STACK SEG
                       MOV          SS,AX
                       MOV          SP,OFFSET STACK_TOP ;SET UP STK PTR

MOV          DX,OFFSET FREE_SPACE
                       MOV          BX,OFFSET STRING_LIST
                       CALL         PRNTR
TEST_DONE:             JMP          TEST_DONE
```

;************************************************************************
;END OF DEBUGGING CODE
;************************************************************************

;************************************************************************
;
;   THIS IS THE MAIN ENTRY POINT FOR THE WHOLE PRINTER DRIVER
;   PRNTR EXPECTS TWO PARAMETERS:
;
;           1. THE OFFSET OF THE STRING LIST TABLE SHOULD BE IN BX reg
;

```
;           2. THE OFFSET OF UNRESTRICTED WORKSPACE ABOVE ALL STRINGS
;              AND OTHER DATA SHOULD BE IN DX reg
;
;**********************************************************************

PRNTR:        ;       PUSHA   ***** 80186 INST. ;SAVE ALL REGISTERS
                                                ; REPLACED BY THE FOLLOWING
                      PUSH    AX
                      PUSH    BX
                      PUSH    CX
                      PUSH    DX
                      PUSH    DS
                      PUSH    ES
                      PUSH    SS
                      PUSH    DI
                      PUSH    SI
                      PUSH    BP

MOV     AX,DATA         ;SET UP SEGMENT REGISTER
                      MOV     DS,AX

;       GET THE OFFSET OF UNRESTRICTED WORKSPACE IN WHICH WE MAY
;       BUILD THE TABLES. CALLER SHOULD SUPPLY THIS IN DX REGISTER

MOV     NEXT_CELL,DX    ;OFFSET OF FREE AREA IN DATA SEGMENT
                                              ; FOR TABLES
                      MOV     TOTAL_CELLS,0   ;COUNTER FOR CELL SPECS
                      MOV     CSPECS_START,DX ;SAVE ORIGIN OF CELL SPEC TABLE.

SUB     CX,CX

;       BX HOLDS OFFSET IN DATA SEGMENT OF STRING LIST

MOV     CL,[BX]         ;GET NUMBER OF STRINGS TO PROCESS
                      INC     BX              ;BX HOLDS OFFSET OF WORD HOLDING
                                              ;OFFSET OF FIRST STRING IN LIST
;       CHECK FOR ZERO STRINGS
                      CMP     CL,0
                      JG      DO_A_STRING
                      JMP     LISTS_DONE

;**********************************************************************
; PROCESS EACH STRING IN THE STRING LIST. BX HOLDS THE OFFSET OF THE FIRST
; ENTRY IN THE STRING LIST TABLE. CL HOLDS THE NUMBER OF STRINGS TO PROCESS
; CSPECS_START HOLDS THE OFFSET OF THE AREA WHERE THE CELL SPECS WILL BE
; BUILT AND SORTED.
;**********************************************************************

DO_A_STRING:          MOV     DX,[BX]         ;DX HOLDS OFFSET OF NEXT STRING DESC
                      INC     BX              ;MAKE BX POINT TO WORD HOLDING
                      INC     BX              ;OFFSET OF NEXT STRING DESC AND
                      PUSH    BX              ;SAVE ON STACK FOR NEXT LOOP

;       NOW LOAD PARAMETERS FOR CURRENT STRING

MOV     BX,DX           ;OFFSET OF CURRENT STRING DESC
                      MOV     AX,[BX+STDESC_XCOORD]
                      MOV     XCOORD,AX

MOV     AX,[BX+STDESC_YCOORD]
                      MOV     YCOORD,AX
```

```
                MOV     AL,[BX+STDESC_FONT]
                MOV     FONT,AL

MOV     AL,[BX+STDESC_DIRECT]
                MOV     DIRECT,AL

PUSH    BX              ;SAVE WHILE DOING NEXT

SUB     BX,BX           ;MULTIPLY FONT BY 6
                MOV     BL,FONT         ;TO MAKE IT AN INDEX
                SHL     BX,1            ;INTO THE FONT_SPEC_TABLE
                MOV     DX,BX
                SHL     BX,1
                ADD     BX,DX

;NOW GET THE PARAMETERS FOR THE FONT REQUESTED

ADD     BX,OFFSET FONT_SPEC_TABLE

MOV     AL,CS:[BX+FDESC_WIDTH]
                MOV     WDTH,AL   ; WIDTH IN BYTES

MOV     AL,CS:[BX+FDESC_HEIGHT]
                MOV     HEIGHT,AL ; HEIGHT IN BITS

MOV     AL,CS:[BX+FDESC_HSPACE]
                MOV     HSPACE,AL

MOV     AL,CS:[BX+FDESC_VSPACE]
                MOV     VSPACE,AL

MOV     AX,CS:[BX+FDESC_IPTOFFS]
                MOV     IPT_OFFS,AX

;NOW INITIALIZE CUMULATIVE POSITIONERS

MOV     HORIZ,0
                MOV     VERT,0

POP     BX ; RESTORE OFFSET OF CURRENT STRING DESCRIPTOR
                PUSH    CX ; SAVE STRING COUNTER

;SET UP REGISTERS TO LOOP THROUGH CHARACTERS OF CURRENT STRING

MOV     SI,NEXT_CELL
                ADD     BX,STDESC_COUNT ;BX IS OFFSET OF CHARACTER COUNT
                SUB     CH,CH
                MOV     CL,[BX]         ;LOOP COUNT = NUMBER OF CHARS

DO_A_CHAR:      INC     BX              ;POINT TO CURRENT CHAR
                SUB     AX,AX
                MOV     AL,[BX]         ;GET THE CHAR
                PUSH    BX              ;SAVE PTR FOR NEXT LOOP
                SHL     AX,1
                ADD     AX,IPT_OFFS     ;POINT TO IPT ENTRY FOR CHAR
                MOV     BX,AX
                MOV     AX,CS:[BX]              ;GET FONT MEM OFFSET FOR CHAR

;NOW BUILD THE CELL SPEC POINTED TO BY SI REG

MOV     [SI+CSPEC_FMEMOFFS],AX  ;FMEM OFFSET
```

```
            MOV         AX,YCOORD
            ADD         AX,VERT
            MOV         [SI+CSPEC_SCANLINE],AX   ;CHAR ORIGIN SCANLINE

MOV         AX,XCOORD
            ADD         AX,HORIZ
            MOV         DX,AX
            AND         AX,0007H
            MOV         [SI+CSPEC_XBITOFFS],AL   ;CHAR ORIGIN BIT REMAINDER

SHR         DX,1
            SHR         DX,1
            SHR         DX,1
            MOV         [SI+CSPEC_XBYTEOFFS],DL  ;CHAR ORIGIN MOD BYTE

MOV         AL,WDTH
            MOV         [SI+CSPEC_WIDTH],AL      ;CHAR WIDTH IN BYTES

MOV         AL,HEIGHT
            MOV         [SI+CSPEC_HEIGHT],AL     ;CHAR HEIGHT IN BITS

;****************************************************************
; NOW CHECK DIRECTION TO COMPUTE CUMULATIVE POSITIONERS FOR NEXT
; CHARACTER THE DRAWING SHOWS THE PRINT ORIENTATIONS
;****************************************************************
```

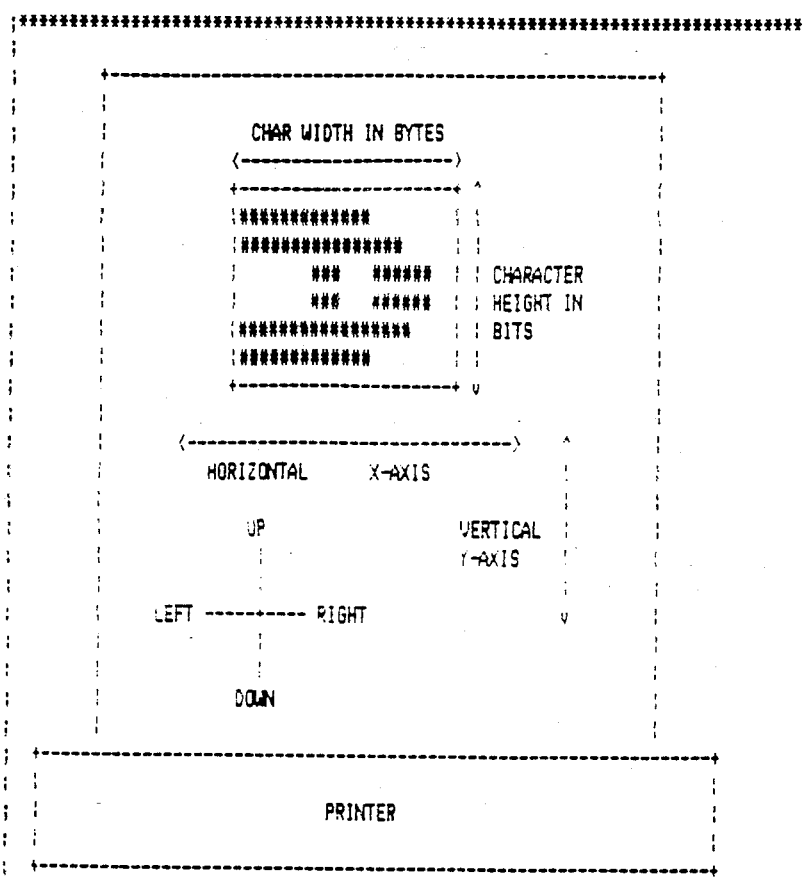

```
;   NORMAL ORIENTATION FOR CHECK PRINTING IS "DOWN"
;
;   NORMAL ORIENTATION FOR RECEIPTS WOULD BE "RIGHT"
```

```
;
;                       #####..   ^  ^
; FONT0:                ..#..#..  |  |
;                       ..#..#.   5  |
; Letter "A"            ..#..#..  |  7    CHAR WIDTH IN BYTES    = 1
;                       #####...  v  |    CHAR HEIGHT IN BITS    = 5
;                          .         |    HORIZ SPACING IN BITS  = 10
;                                 ^       VERT SPACING IN BITS   = 7
;                       <------>
;                        1 BYTE
;
;                       <-- 10 -->
;
;**************************************************************
```

```
                SUB         AX,AX

TRY_RIGHT:      CMP         DIRECT,RIGHT    ;NORMAL, SO TRY THIS FIRST TO SAVE TIME
                JNE         TRY_UP          ;NOT RIGHT- GO ON
DO_RIGHT:       MOV         AL,HSPACE       ;NORMAL ORIENTATION ON A RECEIPT
                ADD         HORIZ,AX        ;NEXT CHAR IN THIS STRING WILL BE PLACED
                JMP         CSPEC_DONE      ;THIS CHARACTER'S HORIZONTAL SPACING
                                            ;TO THE RIGHT OF THIS CAHRACTER
TRY_UP:         CMP         DIRECT,UP
                JNE         TRY_LEFT
DO_UP:          MOV         AL,VSPACE       ;NEXT CHAR WILL BE PLACED THIS
                SUB         VERT,AX         ;CHARS VERTICAL SPACING ABOVE
                JMP         CSPEC_DONE      ;THIS CHARACTER

TRY_LEFT:       CMP         DIRECT,LEFT     ;UPSIDE DOWN & BACKWARDS PRINTING
                JNE         DO_DOWN
DO_LEFT:        MOV         AL,HSPACE       ;NEXT CHAR WILL BE PLACED THIS
                SUB         HORIZ,AX        ;CHAR'S HORIXONTAL SPACING TO THE
                JMP         CSPEC_DONE      ;LEFT OF THIS CHARACTER

DO_DOWN:        MOV         AL,VSPACE       ;NEXT CHAR WILL BE PLACED THIS
                ADD         VERT,AX         ; CHAR'S VERTICAL SPACING BELOW
                                            ;THIS CHARACTER. NORMAL
                                            ; ORIENTATION FOR CHECK

CSPEC_DONE:     ADD         SI,CSPEC_SIZE_IN_BYTES
                INC         TOTAL_CELLS
                POP         BX              ;RESTORE OFFSET OF
                DEC         CX              ;THIS CHAR IN
                JZ          STRING_DONE     ;STRING DESCRIPTOR
                JMP         DO_A_CHAR

STRING_DONE:    POP         CX              ;RESTORE STRING LOOP CTR
                POP         BX              ;RESTORE OFFSET OF
                MOV         NEXT_CELL,SI    ;SAVE THE OFFSET
                DEC         CX              ;NEXT SLOT IN STRING
                JZ          SORT_CSPECS     ;TABLE
                JMP         DO_A_STRING

;**************************************************************
; IN-PLACE BUBBLE SORT OF CSPEC LIST INTO ASCENDING ORDER BASED ON
; CONTENTS OF 1ST WORD IN EACH CELL SPEC
;**************************************************************

SORT_CSPECS:    MOV         CX,TOTAL_CELLS
                DEC         CX              ;OUTER LOOP IS DONE n - 1 TIMES
```

```
I_LOOP:         PUSH        CX                      ;SAVE OUTER LOOP COUNTER

MOV         BX,CSPECS_START         ;BEGINNING OF TABLE TO SORT
                MOV         SWAPPED,0               ;SET FLAG CLEAR FOR NEXT INNER LOOP
                MOV         CX,TOTAL_CELLS          ;INNER LOOP IS DONE n - 2
                SUB         CX,2                    ;TIMES
J_LOOP:         PUSH        CX                      ;SAVE INNER LOOP COUNTER
                MOV         AX,[BX]                 ;COMPARE ACT_CSPEC_INDICES FOR
                CMP         AX,[BX+8]               ;TWO ADJACENT CELLS. IF OUT OF
                JNG         NO_SWAP                 ;ORDER, THEN SWAP THEIR CONTENTS
SWAP:           PUSH        CX                      ;SAVE INNER LOOP COUNTER
                MOV         CX,CSPEC_SIZE_IN_BYTES/2  ;LOOP HERE ONCE FOR EACH
                                                    ;WORD IN A CELL SPEC
SWAP_LOOP:      MOV         AX,[BX]                 ;GET THE WORDS TO SWAP
                MOV         DX,[BX+8]
                MOV         [BX],DX                 ;PUT THEM BACK IN SWAPPED
                MOV         [BX+8],AX               ;POSITIONS
                ADD         BX,2
                LOOP        SWAP_LOOP

POP         CX

MOV         SWAPPED,1               ;SET FLAG SAYING AT LEAST ONE SWAP
                                                    ;IN THRU INNER LOOP
                JMP         NEXT_J

NO_SWAP:        ADD         BX,8                    ;ADJUST POINTER UP ONE CELLSPEC

NEXT_J:         POP         CX                      ;RESTORE INNER LOOP COUNTER

LOOP        J_LOOP

CMP         SWAPPED,0               ;IF FLAG WAS SET, SWAPS WERE MADE
                JNE         NOT_DONE                ;AND WE ARE NOT DONE
                POP         CX                      ;BUT IF FLAG WAS NOT SET,
                                                    ;RESTORE STACK
                JMP         LISTS_DONE              ;AND GET OUT OF SORT ROUTINE

NOT_DONE:       POP         CX                      ;RESTORE OUTER LOOP COUNTER
                LOOP        I_LOOP

;****************************************************************
; CELL SPEC LIST IS SORTED AND READY TO PROCESS SEQUENTIALLY
; NOW FIRE UP THE PRINTER, BUILD SCANLINES, AND PRINT IT ALL
;****************************************************************

LISTS_DONE:     CALL        REL_CLAMP               ; RELEASE PAPER CLAMP
                CALL        ACT_INIT                ; INITIALIZE ACTIVE LIST
                MOV         SCANLINE,0
                MOV         SOL, 01H                ; READY FIRST SOLENOID
                MOV         INSERTED, 0
                MOV         AX, CSPECS_START
                MOV         NXT2CHK,AX
                CALL        SOLENOIDS_OFF           ; RELEASE ANY SOLENOIDS THAT
                                                    ; MIGHT INADVERTENTLY BE ON
                CALL        MOTOR_ON                ; START MOVING PAPER

;****************************************************************
; THIS IS THE TOP OF THE LOOP WHICH IS TRAVERSED ONCE PER SCANLINE
; FIRST WE WAIT TILL CARRIAGE RETURN DETECTED, THEN BUILD A SCANLINE
; AND DUMP IT EVERY TIME THEREAFTER THAT A PRINT CLOCK SIGNAL IS
; DETECTED.
;****************************************************************
```

```
WAIT4RST:           CALL        PRTST
                    AND         AL,AL
                    JZ          WAIT4RST

;****************************************************************
; CHECK NOW TO DETERMINE WHETHER ALL SCANLINES HAVE BEEN MADE
; AND, IF SO, QUIT AND TURN OFF THE MOTOR BEFORE RETURNING
;****************************************************************

WEHAVERST:          CMP         SCANLINE, MAX_SCANS
                    JE          CHECK_PRINTED

CALL        BUILD_NXT_SCAN
                    MOV         BIT,0;

;****************************************************************
; WAIT TILL PRINT CLOCK HAS BEEN ASSERTED
;****************************************************************

WAIT4CLK:           CALL        PRTST
                    AND         AH,AH
                    JZ          WAIT4CLK

;       CHECK WHETHER ALL BITS IN THE SCANLINE HAVE BEEN ACCOUNTED FOR

WEHAVECLK:          CMP         BIT,BITS_PER_SCAN
                    JNE         DO_DE_BIT
                    INC         SCANLINE
                    JMP         WAIT4RST

; TURN OFF THE LAST SOLENOID BY TURNING OFF ALL OF THEM
; THEN FIND THE STATE OF THE CURRENT BIT AND, IF TRUE,
; FIRE PROPER SOLENOID

DO_DE_BIT:          AND         PR_SHADOW, 0F0H ; OFF ALL SOLENOIDS

CALL        ISOLATE_BIT     ; TEST BIT "BIT"
                    AND         AL,AL           ; TEST VALUE PUT HERE
                                                ; BY ISOLATE_BIT
                    JZ          DONT_FIRE

; WE WILL FIRE THE NEXT SOLENOID THIS TIME

FIRE_ONE:           MOV         DL,SOL
                    OR          PR_SHADOW,DL

;       WE MAY OR MAY NOT HAVE ORED A SOLENOID BIT INTO THE SHADOW AT THIS POINT

DONT_FIRE:          INC         BIT             ; POINT TO NEXT BIT
                    CMP         SOL,SOL4        ; IF TRUE RESET TO SOL1
                    JE          SOL_IS_8
SOL_NOT_8:          SHL         SOL,1           ; OTHERWISE SET NXT SOL
                    JMP         WRITE_SHADOW
SOL_IS_8:           MOV         SOL,SOL1        ; RESETS SOL TO SOL1

; WRITE THE VALUE IN THE SHADOW REGISTER TO THE OUTPUT PORT

WRITE_SHADOW:       MOV         AL, PR_SHADOW
                    MOV         PRINT_PORT,AL

; NOW WAIT FOR THE NEXT PRINT CLOCK

JMP         WAIT4CLK
```

```
; THE LAST SCANLINE SHOULD HAVE BEEN PRINTED.
; NOW TURN OFF THE MOTOR AND ALL SOLENOIDS AND RETURN

CHECK_PRINTED:          CALL            MOTOR_OFF;
                        CALL            SOLENOIDS_OFF

; NOW ALL DONE PRINTING, RETURN TO THE ROUTINE THAT CALLED PRNTR

;           POPA    **** 80186 INST.    ; RESTORE ALL REGISTERS REPLACED BY
                                        ; THE FOLLOWING

POP             BP
                        POP             SI
                        POP             DI
                        POP             SS
                        POP             ES
                        POP             DS
                        POP             DX
                        POP             CX
                        POP             BX
                        POP             AX

RET

;ROUTINES FOR MANAGING THE ACTIVE CELL LIST

;INITIALIZING THE ACTIVE CELL LIST

ACT_INIT:               MOV             BX,OFFSET ACTIVE_CELL_TABLE
                        MOV             CX,SIZE_OF_ACT
                        MOV             AX,01H
INIT_ACT:               MOV             [BX+ACT_FWD_PTR],AX ;LINK EACH ENTRY BY
                        INC             AX              ;MAKING EACH FORWARD
                        ADD             BX,6            ;POINTER POINT TO THE
                        LOOP            INIT_ACT        ;NEXT ENTRY IN THE LIST

MOV             FREE_LIST,0     ;FREE LIST STARTS WITH 0th ENTRY
                        MOV             NUMBER_ACTIVE,0 ;ACTIVE LIST IS NULL
                        MOV             ACTIVE_LIST,0FFFFH
                        RET                             ;ALL DONE

;INSERTING A CELL SPEC INTO THE ACTIVE CELL LIST
;AX HOLDS INDEX INTO SORTED LIST OF CELL SPECS
;ALGORITHM IS:
;       OLD_ACTIVE = ACTIVE_LIST
;       ACTIVE_LIST = FREE_LIST
;       FREE_LIST = FREE_LIST(4)
;
;       ACTIVE_ENTRY(CSPINDX) = CELL SPEC INDEX
;       ACTIVE_ENTRY(BKPTR) = NULL   (THIS IS BACK PTR OF 1ST IN NEW ACT LIST)
;       ACTIVE_ENTRY(FWDPTR) = OLD_ACTIVE
;       IF OLD_ACTIVE NOT NULL THEN
;               OLD_ACTIVE ENTRY(BKPTR) = ACTIVE_LIST

INSERT_INTO_ACT:
                        CMP             NUMBER_ACTIVE,MAX_ACTIVE_CELLS
                        JAE             TOO_MANY_INSERTS
```

```
;       MAKE OLD_ACT = ACTIVE_LIST CX USED TO HOLD OLD_ACTIVE
                MOV             DX,ACTIVE_LIST
                MOV             CX, DX

;       ACTIVE_LIST = FREE_LIST
                MOV             SI, FREE_LIST
                MOV             ACTIVE_LIST,SI

;       FREE_LIST = FORMER 2ND ENTRY IN FREE LIST. MULTIPLY INDEX BY 6
                SHL             SI,1
                MOV             DI,SI
                SHL             SI,1
                ADD             SI,DI
                MOV             BX, OFFSET ACTIVE_CELL_TABLE
                MOV             DI, [BX+SI+ACT_FWD_PTR]
                MOV             FREE_LIST, DI

;       SI STILL POINTS TO OFFSET OF NEW ACTIVE ENTRY
;       FIX UP THREE ENTRIES IN NEWLY ACTIVE CELL
                MOV             [BX+SI+ACT_CSPEC_INDEX], AX  ; INDEX OF CSPEC BEING ADDED
                MOV             WORD PTR [BX+SI+ACT_BACK_PTR],0FFFFH
                MOV             AX, CX
                MOV             [BX+SI+ACT_FWD_PTR],AX
                CMP             AX,0FFFFH
                JE              BUMP_ACTIVES

;       OLD_ACTIVE WAS NOT NULL, SO LINK ITS BACK PTR TO THE NEW HEAD OF ACTIVES
;       AX HOLDS OLD_ACTIVE. MULTIPLY IT BY 6
                SHL             AX,1
                MOV             SI,AX
                SHL             SI,1
                ADD             SI,AX
                MOV             AX,ACTIVE_LIST
                MOV             [BX+SI+ACT_BACK_PTR],AX
BUMP_ACTIVES:   INC             NUMBER_ACTIVE
TOO_MANY_INSERTS: RET

;ROUTINE TO REMOVE EXHAUSTED CELL SPEC FROM ACTIVE LIST
;AND RETURN ITS SLOT TO FREE LIST. AX HOLDS INDEX INTO ACTIVE CELL TABLE OF;
;ENTRY TO BE REMOVED
REMOVE_FROM_ACT:
                CMP             NUMBER_ACTIVE,0         ;IF NONE,WE HAVE
                                                        ;A PROBLEM
                JG              OK_TO_REMOVE
                JMP             TOO_MANY_REMOVALS
OK_TO_REMOVE:   MOV             BX,OFFSET ACTIVE_CELL_TABLE  ;HEAD OF TABLE
                MOV             SI,AX                   ;MULTIPLY INDEX BY 6
                SHL             SI,1                    ;TO MAKE IT A BYTE
                MOV             CX,SI                   ;INDEX INTO THE ACT
                SHL             SI,1
                ADD             SI,CX
                MOV             DX,[BX+SI+ACT_BACK_PTR] ;SAVE THIS
                MOV             BACK,DX

MOV             DX,[BX+SI+ACT_FWD_PTR]           ;AND THIS
                MOV             FWD,DX

MOV             DX,FREE_LIST    ;LINK THIS ENTRY INTO
                MOV             [BX+SI+ACT_FWD_PTR],DX

MOV             FREE_LIST,AX    ;FREE LIST AHEAD OF ALL OTHERS
                CMP             BACK,0FFFFH     ;WAS HEAD OF ACT HOLDING
                JNE             NOT_FIRST       ;THE FIRST ENTRY IN FREE LIST
FIRST:          MOV             AX,FWD          ;YES, IT WAS
```

```
                    MOV     ACTIVE_LIST,AX      ;ACTIVE NOW POINTS TO WHAT
                                                ;THIS ENTRY USED TO POINT TO
                    MOV     SI,AX               ;MAKE THIS INTO BYTE INDEX
                    SHL     SI,1
                    MOV     CX,SI
                    SHL     SI,1
                    ADD     SI,CX
                    MOV     WORD PTR [BX+SI+ACT_BACK_PTR],0FFFFH
                                                ;MAKE SUCESSOR'S
                                                ;BACK PTR NULL
                                                ;BECAUSE IT IS NEW HEAD
                                                ;OF ACTIVE LIST
                    DEC     NUMBER_ACTIVE       ;ALL DONE
                    RET
NOT_FIRST:          CMP     FWD,0FFFFH          ;IS ENTRY TO BE REMOVED IN MIDDLE
                    JNE     MIDDLE
LAST:               MOV     SI,BACK             ;NO, IT IS LAST IN LIST
                    SHL     SI,1
                    MOV     CX,SI               ;MAKE THE PREDECESSOR'S
                    SHL     SI,1                ;FORWARD
                    ADD     SI,CX               ;POINTER
                    MOV     WORD PTR [BX+SI+ACT_FWD_PTR],0FFFFH
                                                ;NULL FWD PTR BECAUSE LAST
                    DEC     NUMBER_ACTIVE
                    RET                         ;ALL DONE
MIDDLE:             MOV     SI,FWD              ;CELL TO BE REMOVED IS
                    SHL     SI,1                ;SOMEWHERE IN THE MIDDLE
                    MOV     CX,SI
                    SHL     SI,1                ;MAKE PREDECESSOR'S
                    ADD     SI,CX               ;FWD POINTER
                    MOV     AX,BACK             ;POINT TO SUCESSOR
                    MOV     [BX+SI+ACT_BACK_PTR],AX
                    MOV     SI,AX               ;AND MAKE
                    SHL     SI,1                ;SUCESSOR'S
                    MOV     CX,SI               ;BACK PTR
                    SHL     SI,1                ;POINT TO
                    ADD     SI,CX               ;PREDECESSOR
                    MOV     AX,FWD
                    MOV     [BX+SI+ACT_FWD_PTR],AX
                    DEC     NUMBER_ACTIVE
TOO_MANY_REMOVALS:  RET                         ;ALL DONE
;
; ROUTINE TO DETERMINE THE STATE OF A BIT IN THE SCANLINE BUFFER

ISOLATE_BIT:        SUB     BX,BX               ; CLEAR THIS REGISTER
                    MOV     BL,BIT              ; GET INDEX OF BIT IN
                                                ;  SCANLINE BUFFER
                    MOV     DL,BL               ; SAVE IT TEMPORARILY
                    MOV     CX,3                ; FOR DIVIDE BY 8 TO GET
                    SHR     BX,CL               ;  BYTE INDEX OF BUFF
                    AND     DL,7                ; FIND BIT REMAINDER
                    INC     DL                  ; FOR BITS TO SHIFT OUT
                    ADD     BX,OFFSET BUFF      ; POINT TO BYTE IN MEM
                    MOV     AL,[BX]             ; READ BYTE OF BUFF
                    MOV     CL,DL               ; SHIFT COUNT
                    SHL     AL,CL               ; SHIFT DESIRED BIT OUT
                                                ; TO CARRY FLAG
                    JC      SET_BIT             ; IF CARRY THEN BIT = T
                    SUB     AX,AX               ; CLR AX IF BIT FALSE
                    RET
SET_BIT:            MOV     AX,1                ; SET AX IF BIT TRUE
                    RET
```

```
; ROUTINE TO TURN OFF ALL FOUR SOLENOIDS

SOLENOIDS_OFF:    AND        PR_SHADOW, NOT_SOLENOIDS
                  MOV        AL, PR_SHADOW
                  MOV        PRINT_PORT, AL
                  RET
; ROUTINE TO TURN MOTOR ON

MOTOR_ON:         OR         PR_SHADOW, MTRDRV
                  AND        PR_SHADOW, NOT_MTRSTP
                  MOV        AL, PR_SHADOW
                  MOV        PRINT_PORT, AL
                  RET

; ROUTINE TO TURN MOTOR OFF

MOTOR_OFF:        OR         PR_SHADOW, MTRSTP
                  AND        PR_SHADOW, NOT_MTRDRV
                  MOV        AL, PR_SHADOW
                  MOV        PRINT_PORT, AL
                  RET

; ROUTINE TO REMOVE ALL POWER FROM MOTOR

MTR_PWR_OFF:      AND        PR_SHADOW, NOT_MTRSTP
                  AND        PR_SHADOW, NOT_MTRDRV
                  MOV        AL, PR_SHADOW
                  MOV        PRINT_PORT, AL
                  RET

; ROUTINE TO FIRE A SOLENOID; WHATEVER VALUE IS IN SOL WHEN THIS ROUTINE
; IS CALLED WILL BE OUTPUT; ALL OTHER SOLENOIDS WILL BE TURNED OFF

FIRE_SOLENOID:    AND        PR_SHADOW, NOT_SOLENOIDS
                  MOV        AL, SOL
                  OR         PR_SHADOW, AL
                  MOV        PRINT_PORT, AL
                  RET

; ROUTINE TO SET THE STATE OF THE PAPER CLAMP TRUE, TO HOLD THE PAPER

SET_CLAMP:        OR         PR_SHADOW, CLAMP_ON
                  MOV        AL, PR_SHADOW
                  MOV        PRINT_PORT, AL
                  RET

; ROUTINE TO RELEASE THE PAPER CLAMP

REL_CLAMP:        AND        PR_SHADOW, CLAMP_OFF
                  MOV        AL, PR_SHADOW
                  MOV        PRINT_PORT, AL
                  RET
;****************************************************************
;
; ROUTINE TO BUILD THE NEXT SCANLINE USING THE ACTIVE CELL TABLE, THE CURRENT
; SCANLINE, AND ALL THE VALUES IN THE ACTIVE CELL SPECS
;
;****************************************************************
;     FIRST, CLEAR OUT THE OLD BUFFER SO ALL NEW DATA MAY BE ORED IN
```

```
BUILD_NXT_SCAN:
                        MOV         CX,08H      ; NUMBER OF WORDS TO CLEAR
                        SUB         AX,AX       ; CLEAR THIS TO ZERO
                        MOV         BX, OFFSET BUFF
CLR_BUFF:               MOV         [BX], AX;
                        INC         BX
                        INC         BX
                        LOOP        CLR_BUFF

;       NEXT FIND ANY NEW ACTIVE CELL SPECS TO INSERT INTO THE ACTIVE LIST
;       CHECK WHETHER ALL CSPECS HAVE BEEN MADE ACTIVE BY THIS TIME

CHECK4INSRT:            MOV         DX, INSERTED
                        CMP         DX, TOTAL_CELLS
                        JE          PROCESS_ACT

;       IF THEY HAVE NOT ALL BEEN PLACED INTO ACT THEN CHECK TO SEE IF ANY
;       WILL GO INTO ACT FOR THIS SCANLINE

MOV         BX, NXT2CHK     ; OFFS OF NXT CSPEC TO CHECK
                        MOV         AX,[BX]         ; AX NOW HAS SCANLINE
                        CMP         AX,SCANLINE     ; IS IT = CURRENT SCANLINE?
                        JNE         PROCESS_ACT     ; IF NOT, NO INSERTS

;       NOW INSERT CELLS INTO ACT WHILE THEIR SCANLINES ARE
;       EQUAL TO CURRENT SCANLINE

INSERT_CELL:            MOV         AX,BX           ; OFFS OF CSPEC TO INSERT
                        INC         INSERTED        ; INDEX OF CSPEC TO GO IN
                        CALL        INSERT_INTO_ACT
                        ADD         NXT2CHK, CSPEC_SIZE_IN_BYTES
                        JMP         CHECK4INSRT

;       NOW PROCESS ALL ACTIVE CELLS FIRST CECK WHETHER ANY ARE ACTIVE

PROCESS_ACT:            CMP         NUMBER_ACTIVE,0
                        JG          SOME_R_ACTV
                        RET                         ; BECAUSE NONE R ACTIVE

SOME_R_ACTV:            MOV         SI,ACTIVE_LIST  ; INDX OF ACT OF 1ST ENT
                        MOV         NEXT_ENT,SI     ;  IS NEXT TO LOOK AT
NEXT_CSPEC:             MOV         SI,NEXT_ENT     ; NEXT IS CURRENT
                        MOV         THIS_ENT,SI     ;  ONE TO LOOK AT
                        SHL         SI,1            ; MAKE THIS_ENT AN INDX
                        MOV         DI,SI
                        SHL         SI,1
                        ADD         SI,DI
;       SAVE INDEX IN ACT OF NEXT ENTRY TO CHECK, MAY BE FFFF IF NO MORE

MOV         BX,OFFSET ACTIVE_CELL_TABLE
                        MOV         DX,[BX+SI+ACT_FWD_PTR] ; LINK TO NXT ACTIVE CELL
                        MOV         NEXT_ENT,DX

;       NOW GET OFFSET OF CSPEC TO EXAMINE FIRST; BX STILL HAS OFFSET OF ACT

MOV         BX,[BX+SI]      ; CSPEC OFFSET IN SORTED TABLE

;       PROCESS ONE CELL SPEC

MOV         DI,[BX+CSPEC_XBYTEOFFS]
                        AND         DI, 00FFH       ; WE ONLY WANT BYTE IN LOW
                                                    ; HALF OF DI REG
                        MOV         SI,[BX+CSPEC_FMEMOFFS]
                        SUB         CX,CX
                        MOV         CL,[BX+CSPEC_WIDTH]
```

```
ONE_CELL:       SUB       DX,DX               ; CLEAR SAVE REGISTER
                SUB       AX,AX               ; CLEAR WORK REGISTER
                MOV       AH, CS:[SI]         ; READ A BYTE OF FONT MEM
                                              ; FROM CODE SEGMENT
                PUSH      CX
                MOV       CL,[BX+CSPEC_XBITOFFS]
                SHR       AX,CL               ; ALIGN WITH SCANLINE
                                              ; BIT OFFSET
                POP       CX                  ; RESTORE WIDTH LOOP CTR
                OR        AH,DH               ; OR IN SAVED BITS FROM
                                              ; PREVIOUS BYTE
                MOV       BP, OFFSET BUFF
                OR        DS:[BP+DI],AH       ; OR DATA INTO SCANLINE
                MOV       DH,AL               ; SAVE BITS SHIFTED OUT
                INC       DI                  ; INC SCANLINE BYTE INDEX
                INC       SI                  ; INC FONT MEM INDEX
                LOOP      ONE_CELL
;       NOW IF DH NOT ZERO THEN THERE WAS DATA SHIFTED OUT OF AX WHICH MUST
;       ALSO BE ORED INTO THE SCANLINE. THE BYTE OFFSET IN DI HAS BEEN INCREMENTED
;       SO JUST OR IN DH RATHER THAN AH

OR        DS:[BP+DI],DH

MOV       [BX+CSPEC_FMEMOFFS],SI
                                              ; UPDATE FONT MEM OFFSET
                DEC       BYTE PTR [BX+CSPEC_HEIGHT]
                JNZ       GETNXTCSPC
                MOV       AX,THIS_ENT
                CALL      REMOVE_FROM_ACT
GETNXTCSPC:     CMP       NEXT_ENT, 0FFFFH
                JNE       NEXT_CSPEC

NO_MORE_ACTV:   RET                           ; ALL ACTIVE CELLS PROCESSED
```

Although the preferred embodiment of the invention describes a method and apparatus for dispensing money orders, it should be appreciated that the present invention may be utilized to dispense any type of negotiable instrument.

Although the invention has been described in detail, it is to be clearly understood that the same is by way of illustration and example only and is not to be taken by way of limitation, the spirit and scope of the invention being limited only to the terms of the appended claims.

I claim:

1. A system for dispensing money orders at at least one retail establishment comprising:
   a money order dispenser for dispensing money orders at a retail establishment;
   a digital processor for controlling the operation of the dispenser;
   a memory associated with the digital processor for storing the transaction data and control data;
   a printer with a compartment for storing blank money order forms and coupled to the money order dispenser for receiving a blank money order form from said compartment and printing alphanumeric indicia thereon;
   a host device remotely located from the retail establishment and coupled to the money order dispenser for management and control of the dispenser system;
   a data collector remotely connected to the money order dispenser for issuing a polling command; and
   means in the data collector for receiving transaction information from the money order dispenser upon issuance of said polling command.

2. A system in accordance with claim 1 wherein the host device further comprises a means for inhibiting the operation of the dispenser under predetermined conditions.

3. A system in accordance with claim 1 wherein the money order dispenser further comprises:
   a first security code and a second security code store in said memory and authorizing the operation of the dispenser;
   means for using said codes to detect if the security of the dispenser is compromised; and
   control means responsive to the detecting means for inhibiting operation of the dispenser when the security of the dispenser is compromised.

* * * * *